(12) United States Patent
Motika et al.

(10) Patent No.: US 9,774,451 B2
(45) Date of Patent: Sep. 26, 2017

(54) USING SECURE ELEMENTS TO AUTHENTICATE DEVICES IN POINT-TO-POINT COMMUNICATION

(71) Applicant: QUALCOMM Incorporated, San Diego, CA (US)

(72) Inventors: Goutam Motika, Hyderabad (IN); Samatha Sudabattula, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 178 days.

(21) Appl. No.: 14/617,996

(22) Filed: Feb. 10, 2015

(65) Prior Publication Data
US 2016/0234022 A1 Aug. 11, 2016

(51) Int. Cl.
*H04L 9/32* (2006.01)
*H04L 9/08* (2006.01)
(Continued)

(52) U.S. Cl.
CPC .......... *H04L 9/3213* (2013.01); *H04L 9/0816* (2013.01); *H04L 9/0819* (2013.01);
(Continued)

(58) Field of Classification Search
CPC ... H04L 9/0816; H04L 9/0819; H04L 9/0822; H04L 9/083; H04L 9/32; H04L 9/3213;
(Continued)

(56) References Cited

U.S. PATENT DOCUMENTS

| 8,805,358 B2 | 8/2014 | Wang et al. |
| 2007/0223685 A1* | 9/2007 | Boubion ................. G06F 21/31 380/2 |

(Continued)

FOREIGN PATENT DOCUMENTS

EP   2509352 A2   10/2012

OTHER PUBLICATIONS

International Search Report and Written Opinion—PCT/US2015/062939—ISA/EPO—dated Feb. 24, 2016.

*Primary Examiner* — Theodore C Parsons
(74) *Attorney, Agent, or Firm* — The Marbury Law Group, PLLC

(57) ABSTRACT

Methods, devices, systems, and non-transitory process-readable storage media for using secure elements to authenticate a data source device for providing reporting data to a recipient device via local point-to-point communications. An embodiment method includes operations performed by a secure processor of a recipient device that include generating a random token, a data encryption key, and a control register, encrypting the generated data using a shared encryption algorithm and a secret key associated with a unique identifier of the data source device, decrypting data re-encrypted by the data source device and sent within a response message using the shared encryption algorithm and the secret key, determining whether decrypted data matches the random token, and identifying the data source device is authenticated in response to determining that decrypted data matches the random token. The unique identifier and secret key may be pre-loaded on the recipient device.

30 Claims, 10 Drawing Sheets

(51) Int. Cl.
*H04W 12/06* (2009.01)
*H04L 29/06* (2006.01)
*H04W 84/18* (2009.01)
*H04W 12/02* (2009.01)
*H04W 12/04* (2009.01)

(52) U.S. Cl.
CPC .......... *H04L 9/0822* (2013.01); *H04L 9/3271* (2013.01); *H04L 9/3273* (2013.01); *H04W 12/06* (2013.01); *H04L 63/0428* (2013.01); *H04L 63/061* (2013.01); *H04W 12/02* (2013.01); *H04W 12/04* (2013.01); *H04W 84/18* (2013.01)

(58) Field of Classification Search
CPC . H04L 9/3234; H04L 9/3271; H04L 63/0428; H04L 63/0435; H04L 63/061; H04L 63/08; H04L 63/0853; H04L 63/0876; H04L 63/12; H04L 63/123; H04L 63/126; H04L 2209/80; H04L 2209/805; H04L 2463/062; H04L 9/3273; G06F 21/30; G06F 21/31; G06F 21/34; G06F 21/35; G06F 21/44; G06F 21/445; G06F 2221/2103; G06F 2221/2129; H04W 12/06; H04W 12/04; H04W 12/02; H04W 84/18

See application file for complete search history.

(56) References Cited

U.S. PATENT DOCUMENTS

| | | | |
|---|---|---|---|
| 2009/0222659 A1 | 9/2009 | Miyabayashi et al. | |
| 2009/0227282 A1 | 9/2009 | Miyabayashi et al. | |
| 2009/0243539 A1* | 10/2009 | Gangstoe | H04L 9/0662 320/106 |
| 2010/0095121 A1* | 4/2010 | Shetty | H04L 9/3242 713/170 |
| 2011/0173435 A1* | 7/2011 | Liu | H04L 63/061 713/150 |
| 2013/0012168 A1 | 1/2013 | Rajadurai et al. | |
| 2014/0023195 A1* | 1/2014 | Lee | G06K 7/10257 380/270 |
| 2014/0141747 A1 | 5/2014 | Merrien et al. | |
| 2014/0195429 A1 | 7/2014 | Paulsen | |
| 2014/0279565 A1 | 9/2014 | Trump et al. | |

* cited by examiner

USING SECURE ELEMENTS TO AUTHENTICATE DEVICES IN POINT-TO-POINT COMMUNICATION

BACKGROUND

In today's connected world, users are reliant upon data provided by various data source devices, such as sensor devices, autonomous devices (e.g., robots), meters within smart homes, and other input devices. Often such data source devices are connected to recipient devices (e.g., terminal computers, mobile devices, etc.) via local point-to-point communications, such as wireless signaling via Bluetooth®. However, the potential for hacking is great for such local links, especially in environments where users employ overly simplified passwords and/or no authentication to access data source devices. For example, defibrillators, measurement machines, and other sensitive data gathering devices within hospitals may not utilize strong security protocols when transmitting data back to a main hospital computer.

There is a possibility that recipient devices may receive false data (e.g., bad data from a middleman) that may wreak havoc with users and/or the real-time systems used by recipient devices (e.g., medical diagnostics applications, etc.). For example, in the case of remote monitoring of a patient, a doctor may assume a certain medical condition is present (e.g., low blood sugar, certain heart rate, etc.) based on bad source data from hacked or spoofed medical equipment, and thus may prescribe unsafe measures to treat the incorrect medical condition (e.g., apply an inappropriate intensity of shock, provide too high a dose of insulin, etc.). As another example, in the case of a smart home, a resident may think that an open garage door is closed based on a spoofed reported data from a motion detector or open/close sensor. As another example, wrong data from a temperature sensor associated with a nuclear reactor may cause inactivity leading to accidents.

SUMMARY

Various embodiments provide methods, devices, systems, and non-transitory process-readable storage media for using secure elements to authenticate a data source device, such as a sensor, reporting data to a recipient device via local point-to-point communications. An embodiment method performed by the recipient device may include operations for generating, via a first secure processor of the recipient device, a random token, a data encryption key, and a control register, encrypting, with the first secure processor, the random token, the control register, and the data encryption key using a shared encryption algorithm and a secret key associated with a unique identifier of the data source device, transmitting, via a primary processor of the recipient device, an authentication request message to the data source device that includes the encrypted data for decryption by a second secure processor of the data source device, wherein the authentication request message may be transmitted using local point-to-point communications, receiving, via the primary processor, an authentication response message from the data source device that includes data re-encrypted by the second secure processor, wherein the authentication response message may be received using the local point-to-point communications, decrypting, via the first secure processor, the re-encrypted data using the shared encryption algorithm and the secret key, determining, via the first secure processor, whether decrypted data matches the random token, and identifying, via the first secure processor, the data source device is authenticated in response to determining that decrypted data matches the random token. In some embodiments, the method may further include transmitting, via the primary processor, a success message to the data source device in response to determining that decrypted data matches the random token, wherein the success message may be transmitted using the local point-to-point communications, and transmitting, via the primary processor, a failure message to the data source device in response to determining that decrypted data does not match the random token, wherein the failure message may be transmitted using the local point-to-point communications. In some embodiments, the method may further include receiving, via the primary processor, an attach request from the data source device that includes the unique identifier associated with the data source device, wherein the attach request may be received via the local point-to-point communications, and wherein transmitting, via the primary processor, the authentication request message to the data source device that includes the encrypted data may include transmitting, via the primary processor, the authentication request message to the data source device that includes the encrypted data in response to receiving the attach request. In some embodiments, the method may further include receiving, via the first secure processor, the unique identifier associated with the data source device and the secret key associated with the unique identifier from a remote server, and storing, via the first secure processor, the unique identifier and the secret key.

In some embodiments, the method may further include receiving, via the primary processor, incoming reporting data from the data source device, wherein the incoming reporting data may be received using the local point-to-point communications, and processing, via the primary processor, the received incoming reporting data when the data source device is identified as authenticated. In some embodiments, the control register may include a bit indicating whether future encryption is enabled, and the method may further include determining, via the first secure processor, whether incoming reporting data is to be decrypted based on the bit, sharing, via the first secure processor, the data encryption key with the primary processor in response to determining that the incoming reporting data is to be decrypted, and decrypting, via the primary processor, the incoming reporting data using the shared encryption algorithm and the data encryption key.

In some embodiments, the first secure processor may be a universal integrated circuit card (UICC). In some embodiments, the recipient device may be one of a smartphone, a laptop, and a terminal computer. In some embodiments, the local point-to-point communications may be short-range wireless signals using a wireless communication protocol or communications via a wired connection.

An embodiment method performed by a data source device may include operations for transmitting, via a primary processor of the data source device, an attach request message to the recipient device that includes a unique identifier associated with the data source device, wherein the attach request message may be transmitted using local point-to-point communications, receiving, via the primary processor, an authentication request message from the recipient device that includes data encrypted via a first secure processor of the recipient device, wherein the authentication request message may be received using the local point-to-point communications, decrypting, via a second secure processor of the data source device, the encrypted data using a shared encryption algorithm and a secret key associated with the unique identifier to obtain a random token, a control register, and a data encryption key, re-encrypting, via the second secure processor, the random token and the control register using the shared encryption algorithm and the secret key, and transmitting, via the primary processor, an authentication response message to the recipient device that includes the re-encrypted data for decryption by the first secure processor, wherein the authentication response message may be transmitted using the local point-to-point communications. In some embodiments, the method may further include transmitting, via the second secure processor, the unique identifier and the secret key to a remote server. In some embodiments, the method may further include determining, via the primary processor, whether a success message may be received from the recipient device in response to transmitting the authentication response message, and transmitting, via the primary processor, outgoing reporting data to the recipient device in response to determining that the success message may be received, wherein the outgoing reporting data may be transmitted using the local point-to-point communications. In some embodiments, the control register may include a bit indicating whether future encryption is enabled, and the method may further include determining, via the second secure processor, whether outgoing reporting data is to be encrypted based on the bit, sharing, via the second secure processor, the data encryption key with the primary processor in response to determining that the outgoing reporting data is to be encrypted, and encrypting, via the primary processor, the outgoing reporting data using the shared encryption algorithm and the data encryption key.

In some embodiments, the second secure processor of the data source device may be a universal integrated circuit card (UICC). In some embodiments, the data source device may be one of a smartphone, a robot, a medical equipment device, and a sensor device. In some embodiments, the local point-to-point communications may be short-range wireless signals using a wireless communication protocol or communications via a wired connection.

Further embodiments include computing devices configured with processor-executable instructions for performing operations of the methods described above. Further embodiments include non-transitory processor-readable media on which is stored processor-executable instructions configured to cause computing devices to perform operations of the methods described above. Further embodiments include a communication system including computing devices configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
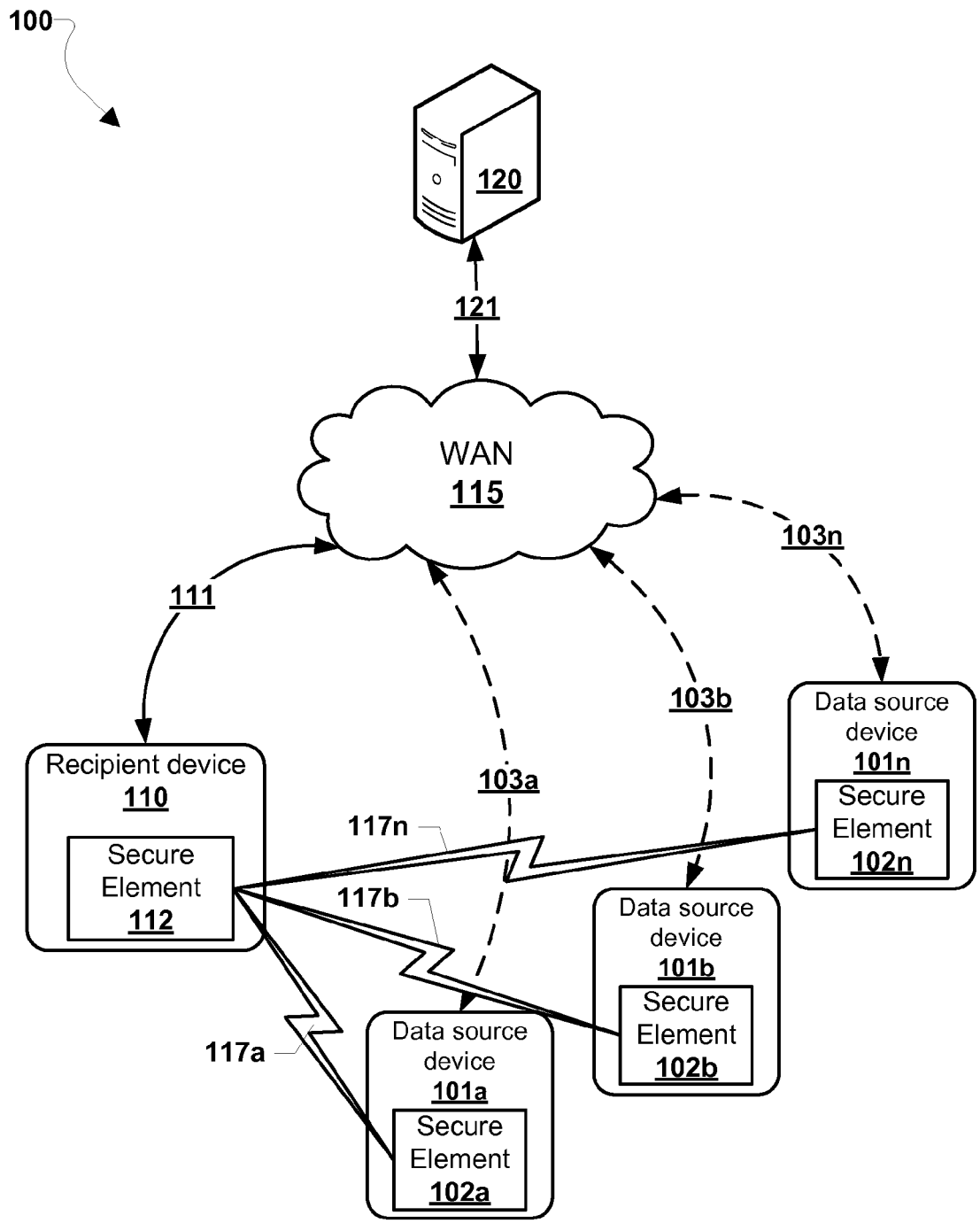
FIG. 1 is a component block diagram of a communication system including a recipient device with a secure element and a plurality of data source devices each having a secure element suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of cellular telephones, smartphones, web-pads, tablet computers, Internet-enabled cellular telephones, robots, sensor devices, medical equipment devices, Wi-Fi® enabled electronic devices, personal data assistants (PDA's), laptop computers, personal computers, terminal computers, and similar electronic devices equipped with at least a processor. In various embodiments, such devices may be configured with one or more networking interfaces (hardware and/or software) for establishing wide area network (WAN) connections (e.g., an Long Term Evolution (LTE), 3G or 4$^{th}$ Generation (4G) wireless wide area network transceiver to connect to a cellular network, a wired connection to a Wi-Fi® local area network (LAN) connected to the Internet, etc.) and/or wireless connections for point-to-point, local communications with other devices (e.g., Bluetooth®, ZigBee®, RF, near-field communications (NFC), etc.).

The term "server" (or "remote server") is used to refer to any computing device capable of functioning as a server, such as a master exchange server, web server, mail server, document server, and a personal or mobile computing device configured with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The terms "secure element(s)" or "secure processor(s)" are used herein to refer to secure processing units within devices. Secure elements or secure processors are designed for enabling the secure processing of data without allowing external aspects (e.g., other devices, other modules/processors within the same device, etc.) to access secure data stored or used therein. Examples of secure elements or secure processors may include universal integrated circuit cards (UICCs) or other secure processing modules, such as subscriber identity modules (SIMs or SIM cards). Secure elements have been conventionally used for authenticating wireless devices subscribing to access cellular networks and/or for conducting financial transactions. For example, subscriber identity module (SIM) cards may be in various devices (e.g., smartphones, tablets, game systems, consumer devices, etc.) to authenticate and enable cellular wide area network (WAN) communications (e.g., $3^{rd}$ Generation (3G), etc.).

Figure 10:
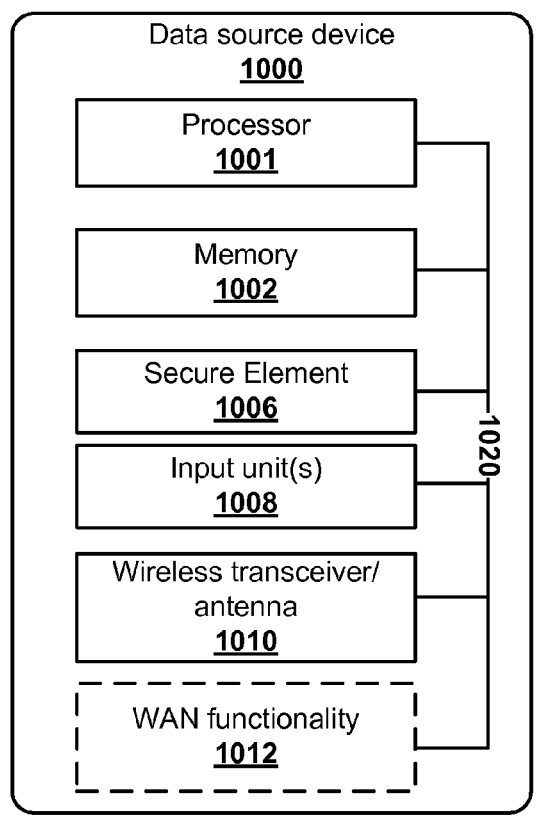
FIG. 10 is a component block diagram of a data source device suitable for use in various embodiments.
Figure 11:
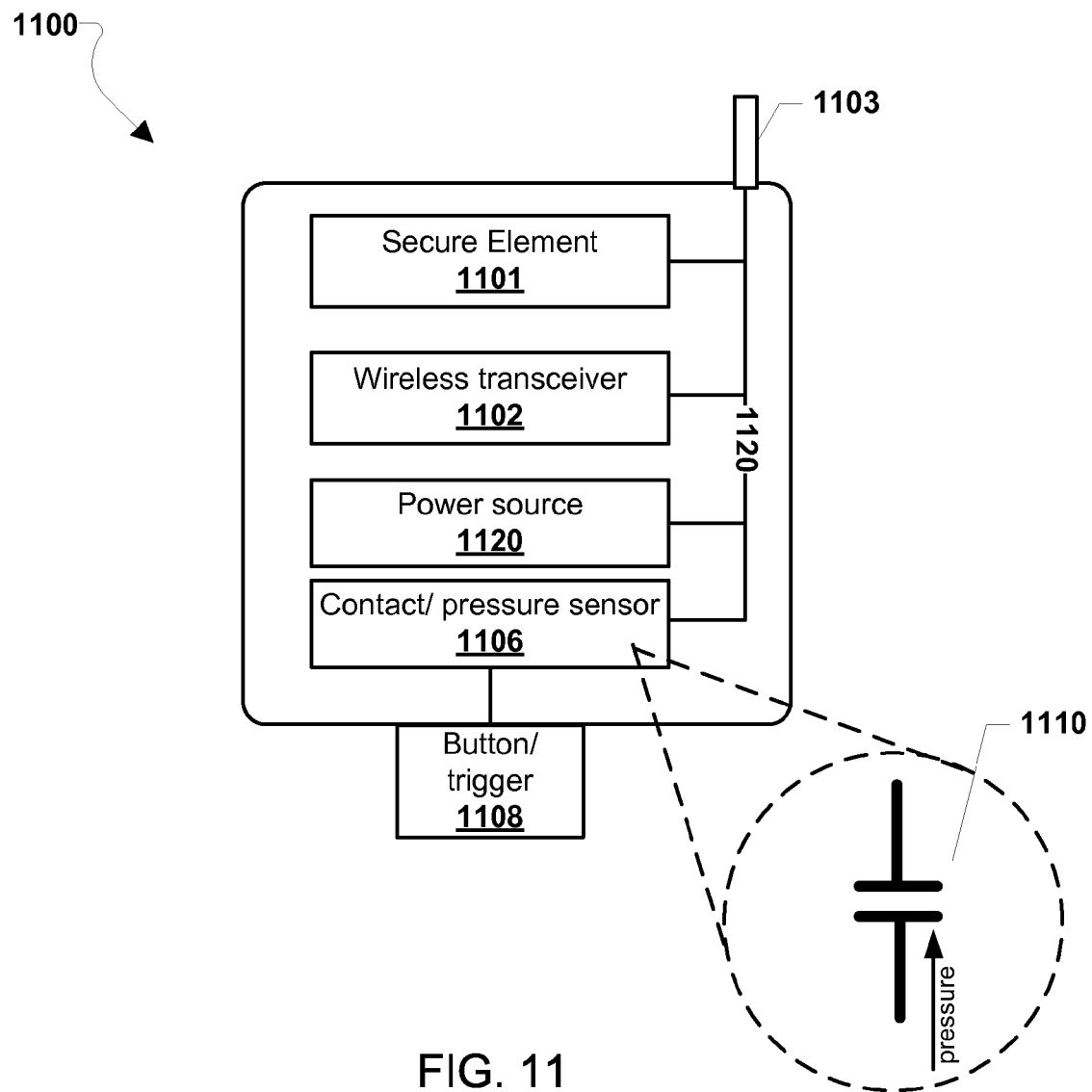
FIG. 11 is a component block diagram of a data source device suitable for use in various embodiments.

The term "data source device" (e.g., a sensor) is used herein to refer to a device including at least a secure element that generates and sends data to other devices. For example, a data source device may be a simple sensor device that includes a UICC having a secure processor configured to process and store secured (or secret) data for transmission to nearby smartphones. Data source devices may typically include input units, such as sensors (e.g., cameras, microphones, etc.), for obtaining data to be reported to recipient devices. For example, data source devices may be or include any of a variety of sensors (e.g., temperature sensors, accelerometers, cameras, microphones, motion sensors, inclinometers, latch sensors, etc.). As another example, data source devices may be simple motion sensors with secure elements of a home security system. In some embodiments, a data source device may include both a secure element (or secure processor) and a primary processor (e.g., an applications processor). For example, a data source device may include a secure processor for handling secure data and a higher-level (or primary) processor configured to handle operations associated with an operating system and/or transmitting encrypted data via networking interfaces. Exemplary data source devices are illustrated in FIGS. 10-11.

Data source devices may be configured to obtain various types of data (referred to herein as "reporting data") to be reported to nearby devices via local point-to-point communications and using secure processors. For example, data source devices may be medical equipment devices (e.g., diagnostic tools, measurement devices, sensors, etc.) configured to obtain medical readings of patients for wireless delivery to smartphone devices utilized by authorized hospital staff (e.g., doctors, nurses, etc.). As another example, data source devices may be robots configured to survey terrain with cameras and other sensors to determine hazards that are wirelessly reported to laptop computer devices utilized by military personnel (e.g., army engineers, etc.).

Figure 8:
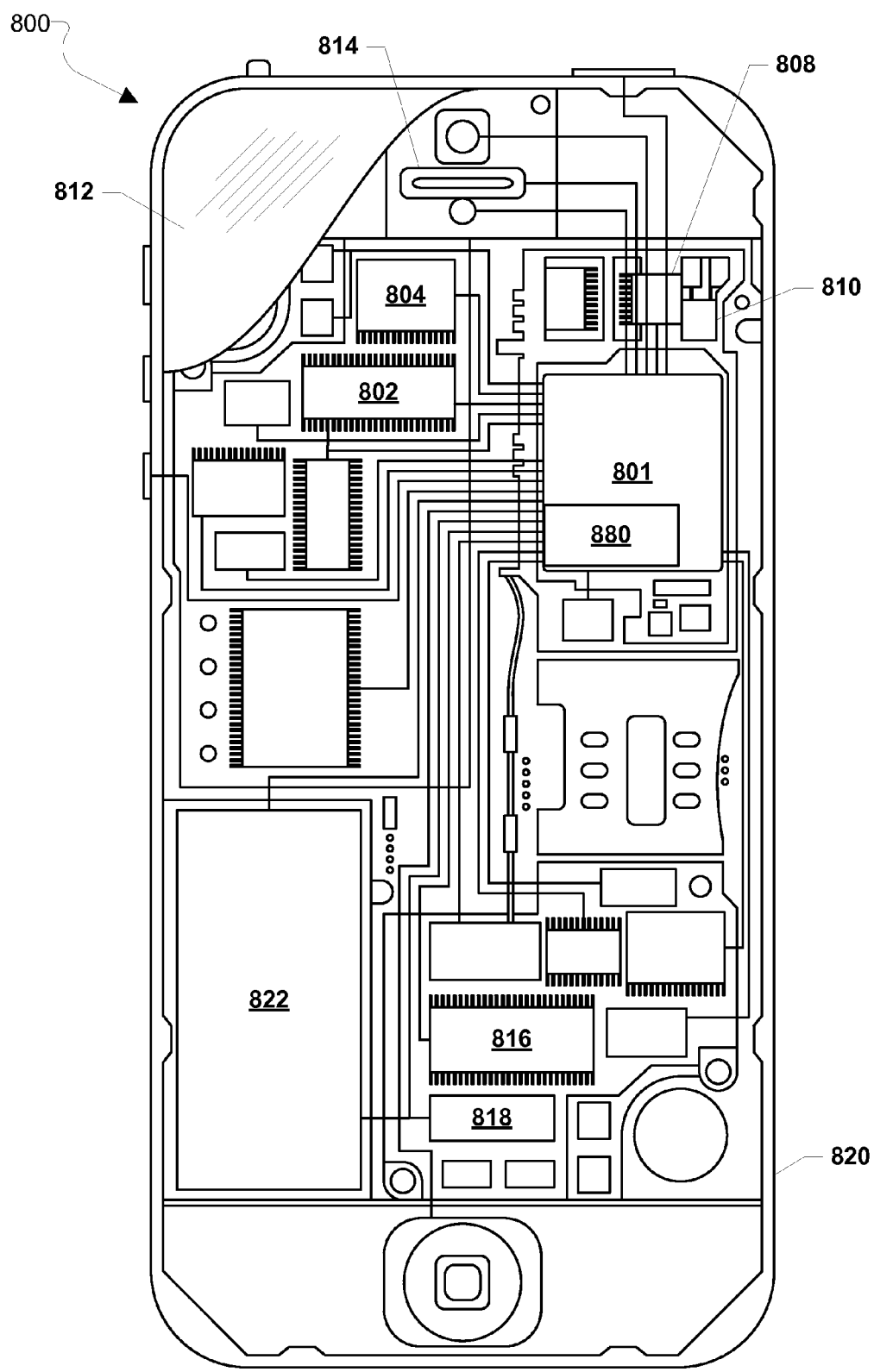
FIG. 8 is a component block diagram of a mobile computing device suitable for use in various embodiments.

The term "recipient device(s)" is used herein to refer to computing devices that may include both a secure element (or secure processor) and a primary processor (e.g., an applications processor) and that may be configured for consuming, managing, and/or otherwise accessing data from data source devices. Examples of recipient devices may include various types of mobile devices, such as smartphones, tablets, laptops, etc. One such exemplary recipient device is illustrated below in FIG. 8.

Recipient devices and data source devices as referred to herein may be functionally similar and/or include the same components and/or functionalities, but may be referred to as recipient devices or data source devices based on their assigned tasks in various circumstances. For example, in one circumstance or implementation a smartphone may be tasked to operate as a data source device (e.g., a microphone, camera, etc.) to collect and send data, in a second circumstance or implementation the smartphone may be tasked to operate as a recipient device to receive data collected by another device, and in a third circumstance or implementation the smartphone may function as both a data source device and as a recipient device receiving sensor data from another data source device (e.g., from a sensor).

The various embodiments provide methods, devices, systems, and non-transitory process-readable storage media for using secure elements to authenticate data source devices via local point-to-point communications. In general, both a data source device (e.g., a sensor device, a robot, etc.) and a recipient device (e.g., a smartphone, a terminal, etc.) may be configured with a secure element (e.g., a UICC) capable of storing and processing information that may not be visible or otherwise accessible to other devices and/or elements within the respective devices. For example, the data source device may be a simple sensor device (e.g., a medical measurement/diagnostic unit, etc.) that includes a UICC having a secure processor configured to process and store secured (or secret) data, and the recipient device may be a smartphone having an application processor configured to handle operations associated with an operating system and/or networking interfaces and a secure processor (e.g., UICC) for storing and processing secret data.

In the various embodiments, the secure elements of both data source devices and recipient devices may store a secret key (referred to herein as 'Ks') in association with a unique identifier corresponding to the data source device (e.g., a device identifier, a "sensor-id", a media access control (MAC) address, etc.), and may both utilize a shared encryption algorithm with the secret key for encrypting/decrypting data. In particular, the secure element of the recipient device may request that the secure element of the data source device decrypt a message having special data encrypted with the secret key and return that special data as re-encrypted data to authenticate itself to the recipient device. In other words, the data source device may prove its trustworthiness by providing re-encrypted that, when decrypted using the secret key stored by the recipient device and the true data source device, matches the original data on the recipient device. Once the secure element of the recipient device determines the data source device is authenticated, the devices may conduct local (or short-range) point-to-point messaging that may or may not be further encrypted. For example, the data source device may begin transmitting Bluetooth® packets that include sensor data that the recipient device may process as trusted data. In this manner, the embodiment techniques enable local authentication between wirelessly-connected devices to improve security and safety of users relying upon reporting data transferred via point-to-point communications between the devices.

In various embodiments, in response to receiving an attach request, the recipient device may be configured to transmit an authentication request message to the data source device that includes special data generated by the recipient device and encrypted using the secret key. In particular, the secure element of the recipient device may be configured to generate a random token (referred to as 'T' herein), a control register (referred to herein as 'CR'), and a data encryption key (referred to as 'Kd' herein) that each may be included within authentication request messages. The random token may be data that is sufficiently large to make it difficult to reproduce or guess by potential intercepting devices. The control register may be a set of bits that includes a pre-associated encryption flag or bit (e.g., bit-0) that may be used by the devices to control subsequent encryptions of reporting data within messages. For example, the control register may be set to indicate to the recipient device and the data source device that sensor data will or will not be encrypted once an authentication procedure is successful. The control register may include other bits that may be used for other purposes than for indicating data encryption. The data encryption key may be data that controls the subsequent data encryptions once the data source device is authenticated. For example, the control register may indicate whether the data encryption key is to be used for subsequent encryptions of robot survey data transferred from an authenticated robot to a recipient device. As the authentication request message includes encrypted forms of the random token, control register, and data encryption key, only an authentic data source device having the particular secret key may access such special data.

In various embodiments, the unique identifier and the secret key associated with the data source device may be pre-populated within the data source device and the recipient device. In some embodiments, the data source device may be configured to report its unique identifier and its secret key to a remote server via a WAN connection prior to transferring data to various recipient devices. For example, before being placed in an active mode for sharing sensor data, the data source device may upload its unique identifier and secret key to a maintenance or manufacturer remote server over the Internet. Alternatively, the secure element of the data source device may be pre-provisioned with the unique identifier and/or the secret key by the remote server, such as during a manufacturing process or initial data download. The remote server may be configured to distribute the secret key and unique identifier for storage in the secure element of the recipient device, such as via over-the-air (OTA), secure transmissions (e.g., via a cellular network transmission, etc.). Such OTA transmissions may be considered upgrades to the recipient device and may be specifically authorized at the remote server, such as based on interoperability/interworking information. For example, the recipient device may receive the secret key associated with the data source device from the remote server as an after-market addition via an OTA update. In some embodiments, OTA updates providing the secret key and unique identifier of the data source device may be restricted to only devices having a secure element, and thus may be limited to only mobile-to-mobile devices configured to properly safeguard the secret key.

In some embodiments, once authentication between a data source device and a recipient device has successfully completed, the data source device may or may not encrypt reporting data that is being sent to the recipient device based on the nature of the data itself. In other words, when the reporting data is not sensitive, the data source device may not encrypt. For example, a data source device associated with an oxygen mask may be configured to always transmit unencrypted reporting data that indicates whether the oxygen mask is being used at a given time (e.g., sending unencrypted "used" or "not used" codes or bits, etc.). However, the data source device may be configured to encrypt reporting data in response to determining that sensitive medical information is included in the reporting data, such as data indicating a 'respirator rate' along with the 'used' or 'not used' code. In some embodiments, a control register bit may be set based on whether the reporting data includes sensitive information.

The following illustrates an exemplary authentication procedure between a recipient device (e.g., a mobile device, a terminal, etc.) and a data source device (e.g., a simple sensor unit used for gathering a patient's medical measurements, etc.), each having secure elements that are both pre-provisioned with a common secret key (Ks) associated with the unique identifier of the data source device. The data source device may send to the recipient device, via short-range wireless point-to-point communications, an attach request that indicates the unique identifier of the data source device (e.g., a sensor-id, etc.). The recipient device may post the received attach request to its included secure processor, which already has stored within it the secret key (Ks) associated with the unique identifier of the data source device. The secure processor of the recipient device may generate a random token (T), a data encryption key (Kd) and control register (CR) that has a bit that indicates that subsequent data encryptions should be enabled once authentication of the data source device is achieved. As used herein, the term "control register" refers to a data structure of flag and other values that may be used to control operations of a processor, particularly when stored into a register (sometimes referred to as a control register) or other memory accessed by the processor for controlling processing operations. Further references to a "control register" are intended to refer to some flag or other data that may be used to control a processor, but not the entire set of such control data. Thus, "control register" is used herein to refer to a portion of the data that may be stored in a register accessed by a processor and not to the physical memory storing such data.

The secure processor of the recipient device may encrypt the token (T), the data encryption key (Kd), and the control register (CR) using the secret key (Ks) and an encryption algorithm that is also known to the data source device (e.g., A3 encryption algorithm, A5 encryption algorithm, stream ciphers, etc.). The recipient device may send an authentication request message with the encrypted data to the data source device. In response, the authentication request message may be posted to the secure processor of the data source device, which may decrypt the authentication request using the secret key (Ks) to identify the data encryption key (Kd), the decrypted token (T), and the control register (CR). The secure processor of the data source device may use the same encryption algorithm with the secret key to re-encrypt the control register (CR) and the token (T). An authentication response message including the re-encrypted data may then be sent by the data source device for decryption by the secure processor of the recipient device. Based on whether the decrypted token from the authentication response message matches the originally-generated token (T), the recipient device may send a success message or a failure message indicating to the data source device whether it has been authenticated. If the data source device is authenticated and the data encryption bit of the control register (CR) indicates further data encryption is enabled, the secure processors of the respective devices may provide the data encryption key (Kd) for internal use by their unsecured components to encrypt and decrypt subsequent data messages (e.g., messages including sensor data, etc.). The data source device may commence with transmitting messages with reporting data in response to receiving a success message.

The embodiment techniques may be beneficial as security improvements for a variety of sensor devices that may be combined with other authentication protocols of communication mediums (e.g., Bluetooth®, Wi-Fi®, etc.). Such embodiment techniques may protect against hardware attacks on sensors and sensor networks (e.g., replay attacks, man-in-the-middle, etc.), allow after-market upgrades of sensors having secure elements, and enable service providers to better control the number of sensors and other data source devices that may connect and provide data to recipient devices.

Further, the various embodiments may improve the functioning of a variety of sensors, sensor networks and other data source devices, as well as recipient devices and networks that communicate with sensors by providing local, efficient procedures for authenticating such devices. In particular, the embodiment techniques may enable recipient devices to avoid expending resources processing data from unauthenticated data source devices, as only messages from data source devices that can properly re-encrypt data in response to authentication requests may be processed. Further, as both recipient devices and data source devices may be pre-provisioned with the secret keys and information needed to authenticate, power conservation at the time of authentication may be improved because expensive WAN transmissions are not required. In other words, by relying upon local, point-to-point communications at the time of authentication and pre-loaded data in secure elements, the embodiment techniques may improve efficiency of the participating devices by requiring only direct communications without need of querying remote sources at the actual time of authentication. Additionally, by communicating encryption bits within control registers, the participating devices may selectively encrypt and decrypt data, thus saving energy and processing operations when such security measures are not explicitly requested by one of the devices.

Unlike conventional methods for authenticating devices, the embodiment techniques are unique in utilizing two secure elements when communicating authentication data between sensors or other data sources and recipient devices. Conventional authentication methods require a device to transmit secure data via secure channels (e.g., encrypted messages via a WAN connection). The embodiment techniques use the secure processors of data source devices (e.g., sensors) and recipient devices to perform local authentication operations, such as encryption, decryption, and matching of credentials/random data. This enables the data source devices (e.g., sensors, etc.) to be very simple devices that may only have secure processors (e.g., no high-level processors), such as thermocouples or latch sensors, coupled to a data transmitter and the secure element, because the secure element processor performs the embodiment authentication and data encryption operations. As the secure elements in data source devices (e.g., sensors, etc.) and recipient devices are pre-loaded with secret keys and data, the various embodiments do not require a remote source of authentication, thereby enabling the data source devices and recipient devices to locally confirm that data sharing may occur via point-to-point, direct communications.

FIG. 1 illustrates a communication system 100 including a recipient device 110 with a secure element 112 and a plurality of data source devices 101a-101n each having a secure element 102a-102n suitable for use in various embodiments. For example, the communication system 100 may be a hospital system that includes a plurality of simple sensor units configured to use secure processors to report medical measurements for storage and use by a secure processor at a hospital terminal. As another example, the communication system 100 may be a home security system that includes a plurality of simple motion detector sensors or window switch sensors with secure elements configured to communicate data for storage and use by a secure processor in a home laptop or smartphone. The recipient device 110 may utilize a wired or wireless connection 111 to a wide area network (WAN) 115, such as the Internet, a cellular network, etc. A remote server 120 may also utilize a wired or wireless connection 121 to the WAN 115. In some embodiments, each of the plurality of data source devices 101a-101n may utilize a wired or wireless connection 103a-103n to the WAN 115.

Each of the plurality of data source devices 101a-101n and the recipient device 110 may include a secure element 102a-102n, 112, such as a secure processor. In various embodiments, the secure elements 102a-102n, 112 may be universal integrated circuit cards (UICC), a subscriber identity modules (i.e., SIMs or SIM cards), or other similar secure processing units within the devices 101a-101n, 110 capable of performing various operations and storing secure data. The devices 110, 101a-101n may also include other processing functionalities, such as primary processors (e.g., application processor, etc.). These other processing functionalities may not be secure and thus may not have access to the secure data and/or operations controlled by the secure elements 102a-102n, 112.

In various embodiments, the recipient device 110 and the data source devices 101a-101n may exchange local point-to-point communications via the wireless connections 117a-117n when within transmission range. Such communications may be accomplished using various wireless communication protocols or standards, such as IEEE 802.11, ZigBee®, Bluetooth®, RF, NFC, etc. In various embodiments, the local point-to-point communications may or may not include data related to authentication procedures. For example, prior to being authenticated with the recipient device 110, the data source devices 101a-101n may transmit wireless messages that include unique identifiers that may cause the recipient device 110 to transmit authentication request messages. As another example, after being authenticated, the data source devices 101a-101n may transmit messages that simply include encrypted or unencrypted reporting data (e.g., sensor data).

Each of the secure elements 102a-102n, 112 may include information indicating secret keys that may be used to encrypt/decrypt data for authenticating the data source devices 101a-101n. In some embodiments, such secret keys may be preloaded on the devices 110, 101a-101n, such as during initial loading procedures in a manufacturing environment. In some embodiments, the secret keys may be transmitted to and/or received from the remote server 120. For example, the data source devices 101a-101n may transmit their individual secret key data to the remote server 120 via the WAN 115, such as during a registration process and/or at some point after initialization. As another example, the recipient device 110 may receive unique identifiers and associated secret keys for each of the data source devices 101a-101n from the remote server 120 via the WAN 115. The remote server 120 may not be used to authenticate the data source devices 101a-101n with the recipient device 110 in real-time, but instead may be a secure hub for distributing information that may be used in the local authentication communications between the recipient device 110 and the data source devices 101a-101n.

Figure 2:
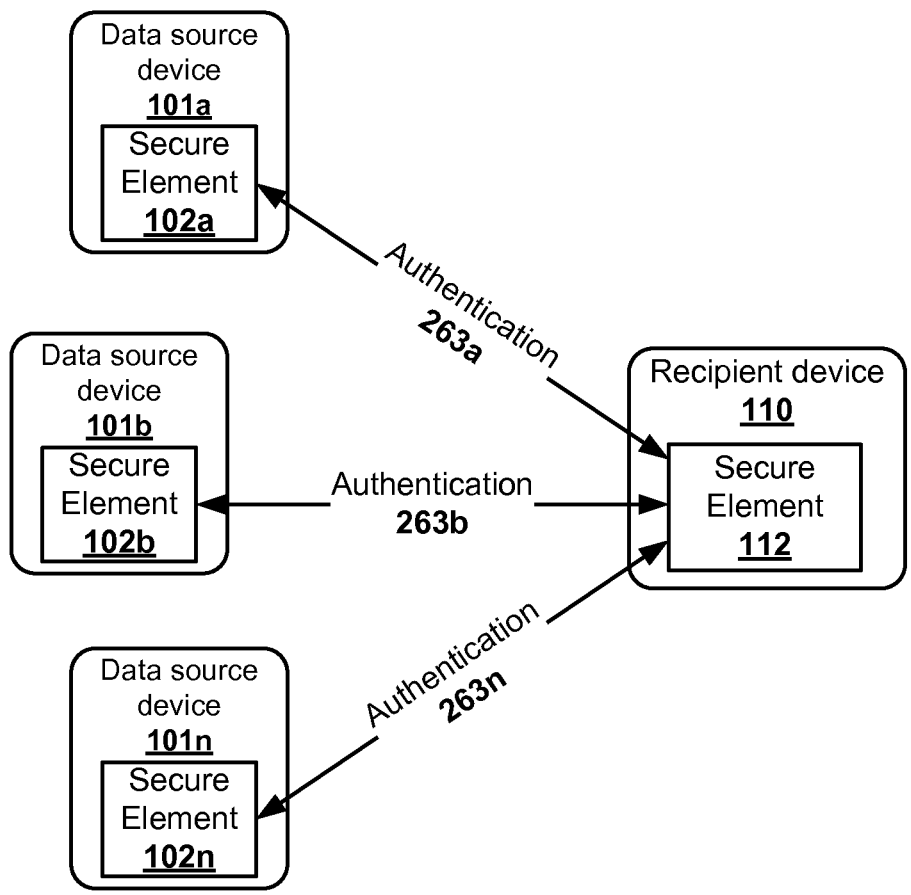
FIG. 2 is a component block diagram illustrating communications involving secure elements for authenticating a plurality of data source devices including secure elements with a recipient device including a secure element according to various embodiments.

FIG. 2 illustrates embodiment authentication communications 263a-263n between secure elements 102a-102n, 112 of a plurality of data source devices 101a-101n (e.g., sensors, etc.) and a recipient device 110 (e.g., a terminal, etc.). The embodiment authentication communications 263a-263n illustrated in FIG. 2 are local and are conducted directly between the data source devices 101a-101n and the recipient device 110, and thus do not require a WAN connection at the time of authentication. Such authentication communications 263a-263n require the participation of the various secure elements 102a-102n, 112. In other words, with such local authentication procedures, the recipient device 110 may not utilize any reporting data from the data source devices 101a-101n until the recipient device 110, via its secure element 112, authenticates each data source device 101a-101n based on the communications 263a-263c. As the secure element 112 of the recipient device 110 is pre-populated with data used for authenticating the data source devices 101a-101n, the authentication of the data source devices 101a-101n may be accomplished based on the secure elements 102a-102n, 112 without any requirement of a WAN connection.

Figure 3:
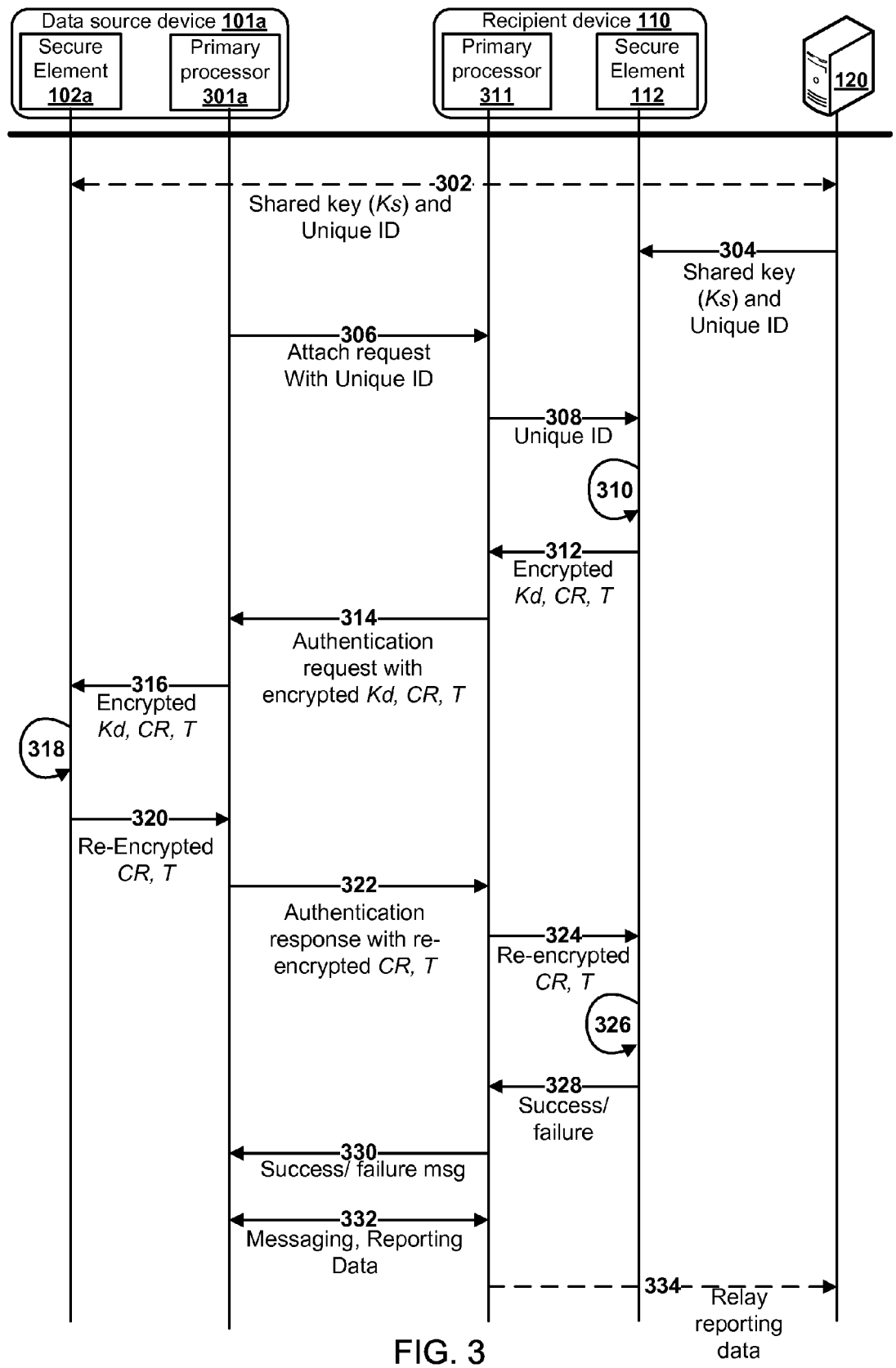
FIG. 3 is a call flow diagram illustrating communications and operations for a recipient device including a secure element to authenticate a data source device including a secure element according to various embodiments.

FIG. 3 illustrates a call flow of communications and operations for a recipient device 110 including a secure element 112 (e.g., a smartphone, etc.) to authenticate a data source device 101a including a secure element 102a (e.g., a simple sensor, a medical device, etc.) according to various embodiments. For example, the communications of FIG. 3 may occur in the context of a home security system between one simple sensor device having a secure processor and an associated home security computer also having a secure processor. In optional communications 302, the data source device 101a may transmit a shared key (Ks) and a unique identifier (ID) to the remote server 120 or alternatively the remote server 120 may transmit the shared key (Ks) and unique identifier to the data source device. For example, the shared key (Ks) and unique identifier may be provided to the data source device 101a during manufacturing or alternatively may be transmitted to the remote server 120 at an arbitrary time during the operation of the data source device 101a (e.g., at boot-up, etc.).

Regardless of whether the secret key (Ks) and unique identifier are originated by the remote server 120 or obtained from the data source device 101a, the remote server 120 may transmit the secret key (Ks) and the unique identifier to the secure element 112 of the recipient device 110 via a communication 304, such as via over-the-air (OTA) update communications. For example, the remote server 120 may transmit the secret key (Ks) and unique identifier to the secure element 112 of the recipient device 110 in response to determining that the recipient device 110 has registered an account or otherwise indicating the recipient device 110 is to be used to exchange messages with data source devices and/or the data source device 101a in particular. The secret key (Ks) and unique identifier may be stored at the recipient device 110 in a secure, local database, data structure, or memory that is accessible only to the secure element 112 (e.g., a database stored by or within the secure element 112).

In some embodiments, the secret key (Ks) and the unique identifier may be stored together within a common data record of a relational database. The secure element 112 of the recipient device 110 may be configured to store a plurality of such data records, each associated with a different data source device, its unique identifier, and its associated secret key received from the remote server 120.

The secret key (Ks) communications 304 may be secure messages via Internet protocols, such as packets encrypted with a strong encryption routine typically used for secure communications over a wide area network (e.g., RSA cipher, etc.). In some embodiments, the secret key (Ks) communications 304 may be transmitted to the recipient device 110 such that the communication 304 is initial received via its primary processor 311 (e.g., an application processor, etc.), and then transferred for secure storage and/or processing by the secure element 112 (e.g., stored in secure memory only accessible by a secure processor).

At some arbitrary time, the data source device 101a may transmit the unique identifier, such as via messages using Bluetooth®, ZigBee®, Wi-Fi®, RF, and/or other wireless communication protocols. In particular, the data source device 101a, via its primary processor 301a (e.g., an application processor) may transmit an attach request message 306 that indicates the unique identifier. When within reception range of the data source device 101a, the recipient device 110, via its primary processor 311 (e.g., an application processor) may receive the attach request message 306 and identify the unique identifier of the data source device 101a. The recipient device 110 may relay the unique identifier from the attach request message 306 to its secure element 112 (or secure processor) via an internal message 308.

In response to receiving the relayed unique identifier, the secure element 112 may perform operations 310 to process the unique identifier, such as by using the unique identifier to perform a look-up operation on a local database or other data structure that is accessible only to the secure element 112 (e.g., a database stored by or within the secure element 112). The secure element 112 may retrieve a data record based on the look-up operations that associates the unique identifier with the shared key (Ks) previously received from the remote server 120. Based on such a look-up operation, the recipient device 110 may generate or otherwise obtain a random token (T), a control register (CR), and a data encryption key (Kd). Using the secret key (Ks) retrieved with the look-up operations, the recipient device 110 may encrypt the random token (T), the control register (CR), and the data encryption key (Kd). The secure element 112 may transmit an internal message 312 including the encrypted data to the primary processor 311 of the recipient device 110. Via the primary processor 311, the recipient device 110 may transmit an authentication request 314 including the encrypted data (e.g., the encrypted Kd, CR, T) for receipt by the primary processor 301a of the data source device 101a.

The primary processor 301a of the data source device 101a may relay the encrypted data (e.g., the encrypted Kd, CR, T) to the secure element 102a via an internal message 316. The secure element 102a may perform operations 318 to process the encrypted data. In particular, the secure element 102a may utilize its secret key (Ks) with a shared encryption algorithm (e.g., A3 encryption algorithm, A5 encryption algorithm, stream ciphers, etc.) to decrypt the encrypted data from the recipient device 110, thereby retrieving the Kd, CR, and T if the secret key (Ks) is the same as used by the secure element 112 of the recipient device 110 when initially encrypted that data. The secure element 102a of the data source device 101a may then re-encrypt just the CR and T using its secret key (Ks) and the encryption algorithm. The re-encrypted data may be relayed via the internal message 320 to the primary processor 301a of the data source device 101a. The primary processor 301 may transmit an authentication response 322 including the re-encrypted data to the recipient device 110 via its primary processor 311.

In response to the primary processor 311 relaying the re-encrypted data from the authentication response 322 to the secure element 112 via an internal message 324, the secure element 112 may perform operations 326 to decrypt the re-encrypted data using the secret key (Ks) and the encryption algorithm. The secure element 112 may then compare decrypted data to the stored token (T) to determine whether they match. Based on this comparison, the secure element 112 may transmit an internal message 328 to its primary processor 311 indicating the success or failure of the comparison (e.g., success when the token (T) matches decrypted data, failure when the token does not match). The primary processor 311 may then transmit a success or failure message 330 to the primary processor 301a of the data source device 101a. When the message 328 indicates a successful authentication, the data source device 101a and the recipient device 110 may begin to exchange messages 332, such as reporting data transmitted by the data source device 101a for use at the recipient device 110. In some embodiments, the recipient device 110 may relay received reporting data via communications 334 to the remote server 120, such as by relaying sensor data for storage and/or use at the remote server 120.

Figure 4:
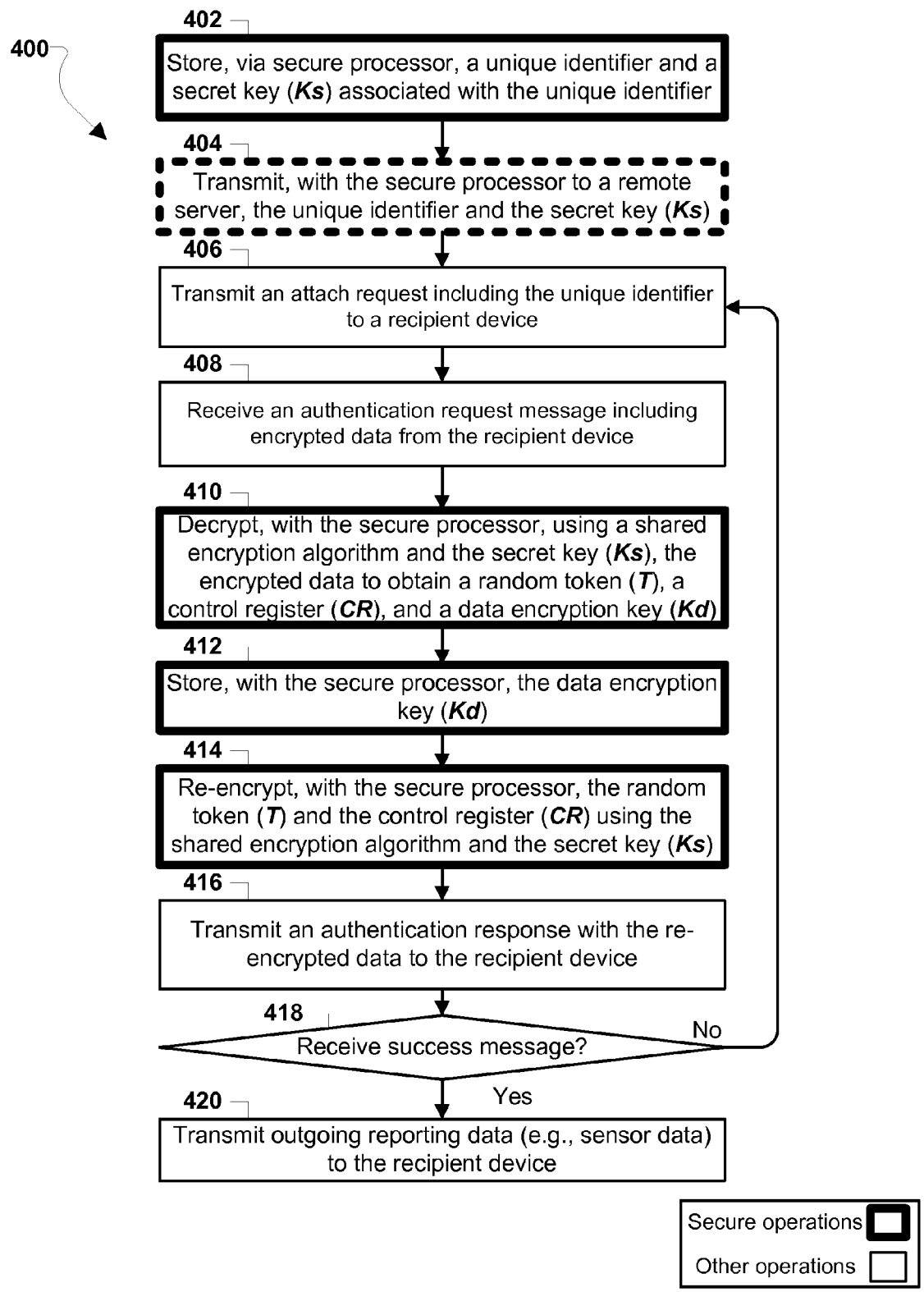
FIG. 4 is a process flow diagram illustrating an embodiment method for a data source device to utilize a secure element to become authenticated for providing reporting data to a recipient device.
Figure 5:
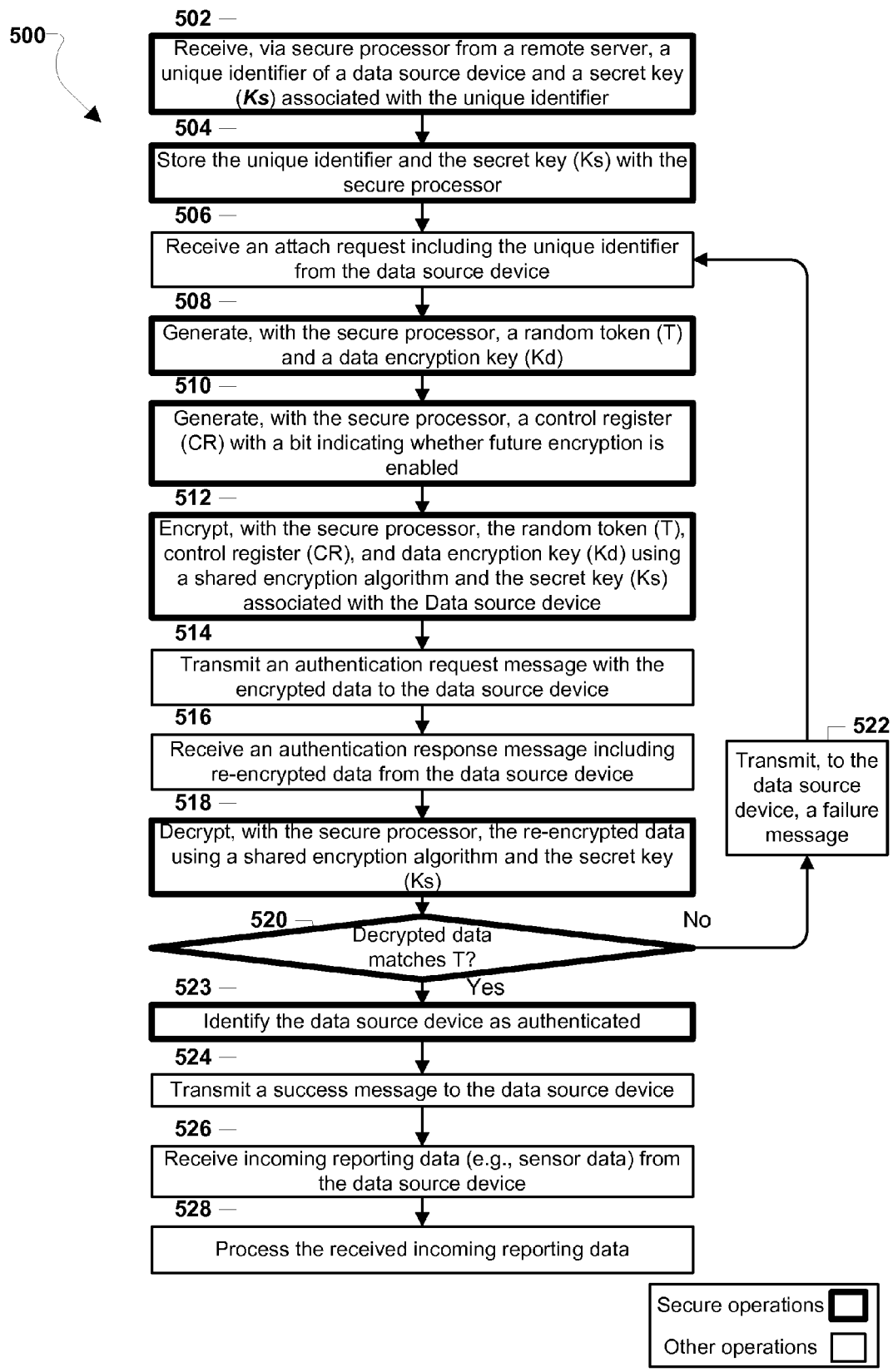
FIG. 5 is a process flow diagram illustrating an embodiment method for a recipient device to utilize a secure element to authenticate a data source device for providing reporting data to be used by the recipient device.

FIGS. 4-5 illustrate embodiment methods 400, 500 that may be performed by a data source device and a recipient device, respectively. The methods 400, 500 may include complementary operations that may be executed by the respective devices concurrently. The devices may also be configured to perform one or both of the methods 400, 500 depending upon operating conditions at a given time. For example, at a first time, a smartphone computing device may be configured to perform the method 400 as a data source device and at a second time the smartphone may perform the operations of method 500 as a recipient device. For ease of description, both a secure processor and a primary processor are referred to as performing various operations for a data source device or a recipient device. As described above, such secure processors may be any secure processing units (i.e., processor of a secure UICC, etc.) and the primary processors may be any other processing units of a device that are not secured, such as an application processor. Additionally, transmissions made between recipient devices and data source devices may not require a WAN connection but instead may occur via local, point-to-point communications, such as via short-range wireless signaling (e.g., NFC, Bluetooth®, ZigBee®, RF, Wi-Fi®, etc.) or communications transmitted via a wired connection (e.g., Ethernet, etc.).

FIG. 4 illustrates an embodiment method 400 for a data source device (e.g., a smartphone, a robot, a medical equipment device, a simple sensor device, etc.) to utilize a secure processor to become authenticated for providing reporting data to a recipient device. In block 402, the data source device, via its secure processor, may store a unique identifier and a secret key (Ks) associated with the unique identifier. For example, the secure processor may store a unique device identifier (e.g., secure-id, MAC address, etc.) and a secret key (e.g., a random seed, password, etc.) that are not widely known or typically transmitted to other devices. In some embodiments, the secret key and/or unique identifier may be provided to the data source device by a remote server, such as during an initialization phase of manufacturing of the data source device, or during a subsequent installation and configuration process.

In optional block 404, the data source device, via its secure processor, may transmit to a remote server the unique identifier and the secret key (Ks). For example, the data source device may transmit an encrypted message via a WAN connection. The operations of optional block 404 may be optional as, in some embodiments, the remote server may have previously provided the secret key and/or the unique identifier to the data source device as described above. In some embodiments, the data source device may transmit the secret key and/or unique identifier to the remote server during a registration procedure, such as within messaging for establishing an account/profile with an authentication service, etc.

In block 406, the data source device, via its primary processor, may transmit, to a recipient device, an attach request including the unique identifier. For example, the data source device may transmit one or more Bluetooth® packets that include the unique identifier as well as other data indicating the data source device has data available for sharing with nearby recipient devices. The operations of block 406 may be performed after an arbitrary period of time after the operations of optional block 404. In some embodiments, the data source device may be configured to repeatedly transmit the attach request message, such as for a set number of times or until a response is received from the recipient device.

In block 408, the data source device, via its primary processor, may receive, from the recipient device, an authentication request message including encrypted data. For example, the data source device may receive one or more Bluetooth® packets that include data (e.g., metadata, header information, etc.) indicating encrypted data is included for authentication purposes. Such a received message (or the encrypted data therein) may be posted to the secure processor in response to the data source device determining that it is related to the authentication process. In some embodiments, the received authentication request message may include the recipient device's identifier that may be used to identify the device that transmitted the message (e.g., information that may be used by the secure processor for cross-referencing the attach request and the authentication request). In block 410, the data source device, via its secure processor, may decrypt the received encrypted data using a shared encryption algorithm (e.g., A3 encryption algorithm, A5 encryption algorithm, stream ciphers, etc.) and the secret key (Ks) to obtain a random token (T), a control register (CR), and a data encryption key (Kd). In other words, the secure element may perform operations to identify various pieces of the payload of the received message using the secret key pre-populated in the secure element.

In block 412, the data source device, via its secure processor, may store the data encryption key (Kd). The data encryption key may be used if the control register (CR) includes a subset of its entire bits (e.g., the first bit) that indicate that subsequent data transfers by the data source device should be encrypted prior to being transmitted to the recipient device. In block 414, the data source device, via its secure processor, may re-encrypt the random token (T) and the control register (CR) using the shared encryption algorithm and the secret key (Ks). The secure processor may post the re-encrypted data back to the primary processor. In some embodiments, the data source device may adjust the control register (CR) prior to re-encryption in order to indicate settings, preferences, and/or other requirements for subsequent reporting data transmissions to the recipient device. For example, the data source device may change the CR to indicate that future transmissions of sensitive information (e.g., health data, etc.) are to be encrypted regardless of whether the recipient device initially requested encrypted reporting data. In block 416, the data source device, via its primary processor, may transmit an authentication response with the re-encrypted data to the recipient device.

In determination block 418, the data source device, via its primary processor, may determine whether a success message is received from the recipient device. In some embodiments, the received success (or failure) message may include the recipient device's identifier for cross referencing purposes (e.g., matching the sent authentication response to the success (or failure) message, etc.). In response to determining that a success message has not been received from the recipient device (i.e., determination block 418="No"), the data source device may continue with the operations in block 406 for transmitting another attach request. In some embodiments, the data source device may receive a failure message (i.e., determination block 418="No") when the associated recipient device is not configured to handle or otherwise process subsequent transmissions from the data source device. For example, the recipient device may transmit an error, failure, or other non-success message when the recipient device is not capable of decrypting reporting data. Such a failure message may include data that may be used by the data source device for changing internal settings and/or for handling subsequent attach requests to the recipient device.

In response to determining that the success message is received from the recipient device (i.e., determination block 418="Yes"), the data source device, via its primary processor, may transmit outgoing reporting data (e.g., sensor data) to the recipient device in block 420. Such transmissions may be via local point-to-point communications, such as short-range wireless signaling using a Bluetooth®, Wi-Fi®, or similar wireless communication protocol, etc.

FIG. 5 illustrates an embodiment method 500 for a recipient device (e.g., a smartphone, a laptop, a terminal computer, etc.) to utilize a secure processor to authenticate a data source device (e.g., a simple sensor device, etc.) for providing reporting data to be used by the recipient device. In block 502, the recipient device, via its secure processor, may receive from a remote server a unique identifier of a data source device and a secret key (Ks) associated with the unique identifier. In some embodiments, the information from the remote server may be received by other processing units of the recipient device and posted to the secure processor for processing. For example, the unique identifier and secret key may be encrypted within a message that is decrypted by the secure processor.

In block 504, the recipient device, via its secure processor, may store the unique identifier and the secret key (Ks). For example, the secure processor may store the unique identifier in relation to the secret key in a database or other similar data structure that may be queried by the secure processor. In block 506, the recipient device, via its primary processor, may receive an attach request including the unique identifier from the data source device. The attach request may be posted to the secure processor.

In block 508, the recipient device, via its secure processor, may generate a random token (T) and a data encryption key (Kd) in response to the attach request. For example, the secure processor may utilize a random number generator to generate the token and/or data encryption key. In some embodiments, the generation of the token and/or data encryption key may be done prior to receiving the attach request or on-demand. In block 510, the recipient device, via its secure processor, may generate a control register (CR) with a bit indicating whether future encryption is enabled. The bit (or data encryption bit) may be set based on default settings of the recipient device, such as configurations or preference settings that indicate all reporting data from other devices should be encrypted to ensure reliability.

In block 512, the recipient device, via its secure processor, may encrypt the random token (T), control register (CR), and data encryption key (Kd) using a shared encryption algorithm and (e.g., A3 encryption algorithm, A5 encryption algorithm, stream ciphers, etc.) the secret key (Ks) associated with the data source device unique identifier. For example, the secure processor may concatenate the token, control register and data encryption key together for encryption, or alternatively may encrypt each separately prior to concatenation. The secure processor may post the encrypted data to the primary processor for transmissions. In block 514, the recipient device, via its primary processor, may transmit, to the data source device, an authentication request message with the encrypted data. For example, the authentication request message may be a Bluetooth® packet. The authentication request message may include identifying information of the recipient device (e.g., a device identifier, MAC address, etc.) for tracking and/or cross-referencing purposes. In some embodiments, the recipient device may be configured to repeatedly transmit the authentication request message, such as for a set number of times or until a response is received from the data source device.

In block 516, the recipient device, via its primary processor, may receive an authentication response message including re-encrypted data from the data source device. The primary processor may post the re-encrypted data from the received authentication response message to the secure processor. In some embodiments, the received authentication response message may include unencrypted data, such as the data source device unique identifier, that may be used to identify which device transmitted the message. Such unencrypted information may be used by the secure processor for cross-referencing the authentication response and the authentication request. In block 518, the recipient device, via its secure processor, may decrypt the re-encrypted data from the received authentication response message using the shared encryption algorithm and the secret key (Ks).

In determination block 520, the recipient device, via its secure processor, may determine whether decrypted data matches the random token (T). For example, the secure processor may compare decrypted data to identify whether it includes data matching the random token stored via the secure processor in association with the unique identifier. In response to determining that decrypted data does not match the random token (T) (i.e., determination block 520="No"), the recipient device, via its primary processor, may transmit a failure message to the data source device in block 522, and may continue receiving an attach request with unique identifier in block 506 as described above.

In some embodiments, the recipient device may send the failure message when the data source device is authenticated, but requires encryption of reporting data that the recipient device is incapable of decrypting. In such a case, the recipient device may include information in the failure message that indicates whether the recipient device is configured or otherwise capable of decrypting reporting data from the data source device and/or how future re-negotiations should be carried out by the data source device. For example, the failure message may include a number of negotiation attempts. In some embodiments, the recipient device may renegotiate with the data source device via a transmitted negotiation request. In some embodiments, negotiation requests may be indicated as another bit in the control register (e.g., a retry bit). In some embodiments, if a negotiation fails, the recipient device may be configured to reject future attach requests from the data source device, providing appropriate error messages or codes.

In response to determining that decrypted data matches the random token (T) (i.e., determination block 520="Yes"), the recipient device, via its secure processor, may identify the data source device as authenticated in block 523, such as by storing data in a data record that indicates data received from the data source device (e.g., data including the unique identifier) may be trusted. In block 524, the recipient device, via its primary processor, may transmit a success message to the data source device. The success or failure message may include identifying information of the recipient device. In block 526, the recipient device, via its primary processor, may receive incoming reporting data from the data source device, such as sensor data. For example, the recipient device may receive Bluetooth® messages including camera imagery, thermal scans, etc. obtained from a robot data source device. In some embodiments, the reporting data may be unencrypted, encrypted, and/or partially encrypted. For example, the recipient device may receive information from the remote server indicating how data within the reporting data is organized and/or encrypted.

In block 528, the recipient device, via its primary processor, may process the received incoming reporting data, such as by transmitting the incoming reporting data to a remote server.

Figure 6:
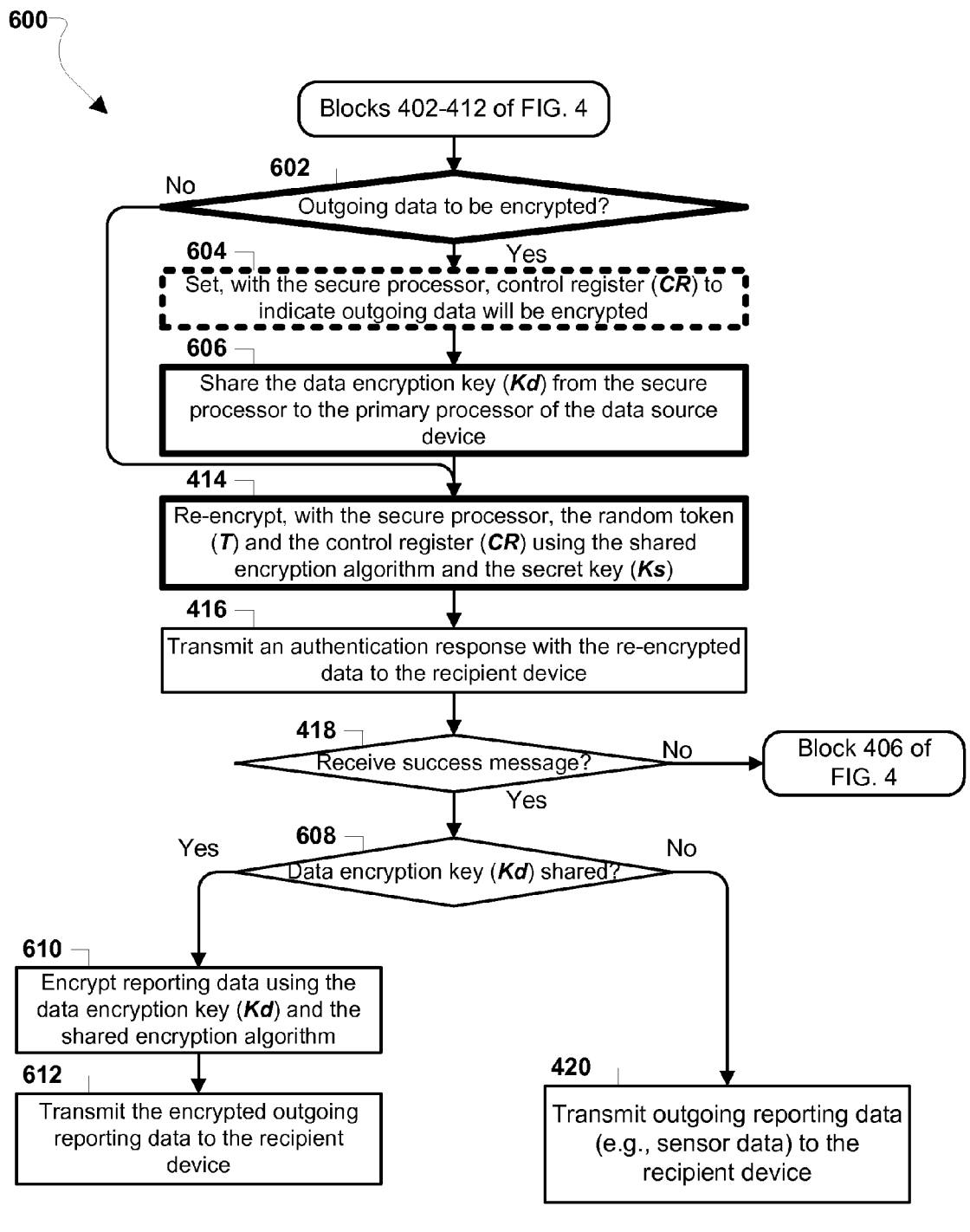
FIG. 6 is a process flow diagram illustrating an embodiment method for a data source device to utilize a secure element to become authenticated for providing encrypted reporting data to a recipient device.
Figure 7:
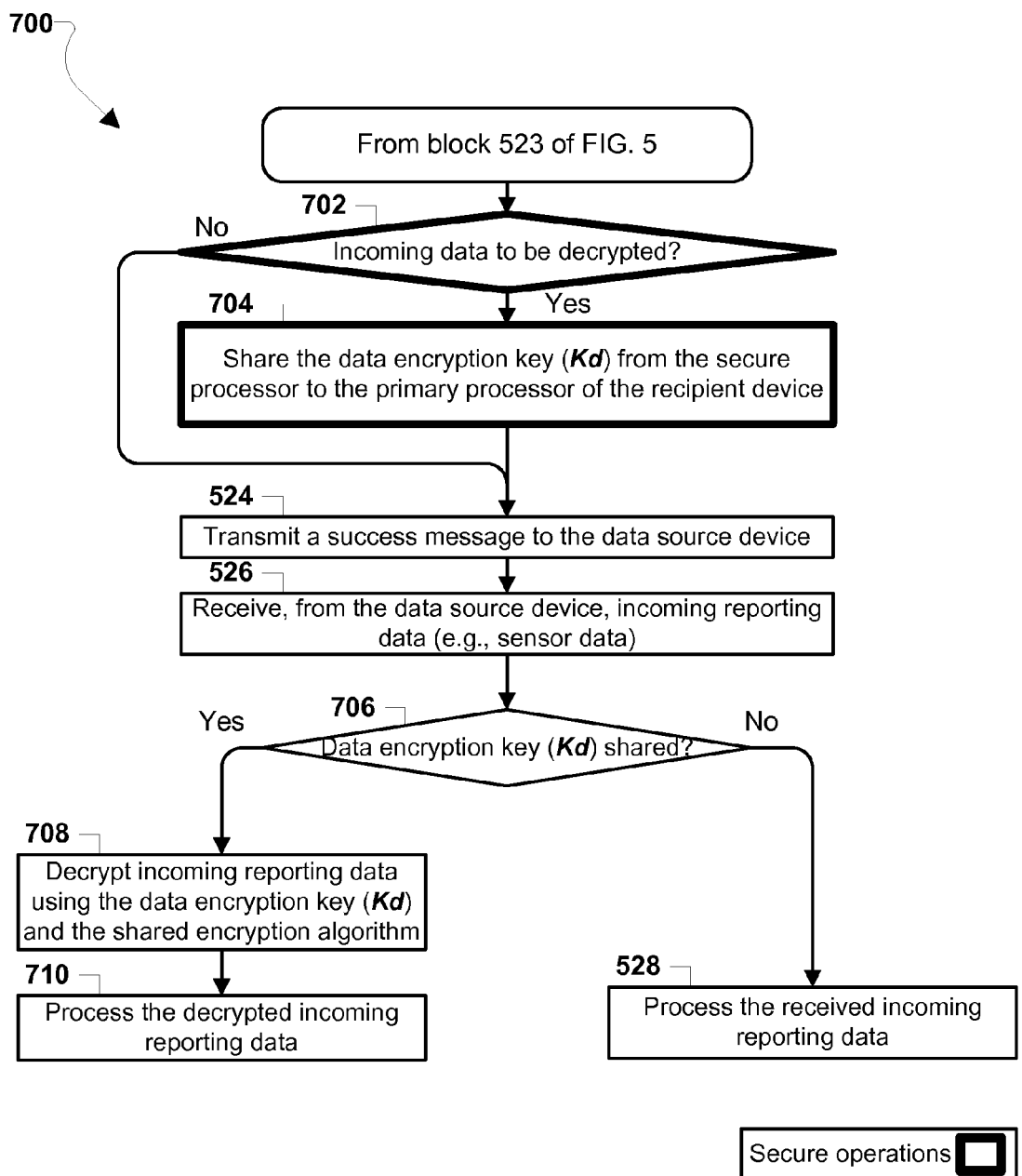
FIG. 7 is a process flow diagram illustrating an embodiment method for a recipient device to utilize a secure element to authenticate a data source device for providing encrypted reporting data to be used by the recipient device.

FIGS. 6-7 illustrate embodiment methods 600, 700 that may be performed by a data source device and a recipient device, respectively. The methods 600, 700 may be considered to include operations complementary to each other, and thus may be executed by devices concurrently. The devices may be configured to perform one or both of the methods 600, 700 depending upon operating conditions at a given time. For example, at a first time, a smartphone computing device may be configured to perform the method 600 as a data source device and at a second time the smartphone may perform the operations of method 700 as a recipient device. For ease of description, both a secure processor and a primary processor are referred to as performing various operations for a data source device or a recipient device. Such secure processors may be any secure processing units (i.e., processor of a secure UICC, etc.) and the primary processors may be any other processing units of a device that are not secured, such as an application processor. Additionally, transmissions made between recipient devices and data source devices as described below may not require a WAN connection but instead may occur via local, point-to-point communications, such as via short-range wireless signaling (e.g., NFC, Bluetooth®, ZigBee®, RF, Wi-Fi®, etc.).

FIG. 6 illustrates an embodiment method 600 for a data source device (e.g., a smartphone, a robot, a medical equipment device, a simple sensor device, etc.) to utilize a secure processor to become authenticated for providing encrypted reporting data to a recipient device. The method 600 may be similar to the method 400 described above with reference to FIG. 4, including many of the same operations. However, the method 600 may also include operations for encrypting reporting data sent after the data source device has been authenticated by a recipient device. For example, based on an encryption bit (e.g., bit-0) of a control register, the data source device may encrypt reporting data sent to the recipient device using an algorithm and data encryption key (Kd) shared with the recipient device. In this way, security may be further improved by not only authenticating devices, but also obscuring data transmitted between authenticated devices.

The data source device may perform the operations of blocks 402-412 as described above with reference to FIG. 4. In determination block 602, the data source device, via its secure processor, may determine whether outgoing reporting data is to be encrypted. In particular, the secure processor may evaluate a predefined bit (i.e., an encryption bit) within the control register received from the recipient device to identify whether the recipient device has requested that reporting data be encrypted during the authentication process. For example, the data source device may determine outgoing reporting data is to be encrypted using the data encryption key (Kd) passed by the recipient device in the encrypted authentication request message when the first bit of the control register (CR) also passed in the encrypted authentication request is set to a '1' value. In some embodiments, the data source may set the encryption bit of the control register or override the value of the encryption bit provided by the recipient device. For example, regardless of the requested encryption as indicated in the original value for the encryption bit transmitted by the recipient device, the data source device may set the encryption bit in the control register to indicate that encryption will be required in subsequent data transmissions. Such overriding may be based on default settings or configurations of the data source device, such as a predefined configuration data that requires all data be encrypted/not encrypted. Further, in some embodiments, the operations in determination block 602 may be optional, such as in cases in which the data source device may be configured to always encrypt or not encrypt outgoing reporting data (e.g., sensor data, etc.).

In response to determining that the outgoing reporting data is to be encrypted (i.e., determination block 602="Yes"), the data source device, via its secure processor, may set the control register (CR) to indicate outgoing reporting data will be encrypted in optional block 604. The operations in optional block 604 may be optional as in some cases the control register (CR) bit may already be set as received from the recipient device. In other words, the recipient device may have previously indicated that all data transmissions should be encrypted. In block 606, the data source device, via its secure processor, may share the data encryption key (Kd) with its primary processor, such as by posting the data encryption key or otherwise making the key available for use with components of the data source device that are not secured. The data source device may also provide information indicating the encryption algorithm to be used with the data encryption key. In some embodiments, when data encryption is required, the secure processor of the data source device may not share the data encryption key (Kd), but may instead be used to encrypt data packets for transmission to the recipient device.

In response to determining that the outgoing reporting data is not to be encrypted (i.e., determination block 602="No"), or in response to performing the operations in block 606, the data source device, via its secure processor, may encrypt the random token (T) and the control register (CR) using the shared encryption algorithm and the secret key (Ks) in block 414. In block 416, the data source device, via its primary processor, may transmit an authentication response with the encrypted data in block 416 and determine whether a success message is received in determination block 418 as described above with reference to FIG. 4. In response to determining that a success message was not received (i.e., determination block 418="No"), the data source device may continue transmitting an attachment request including the unique identifier in block 406 as described above with reference to FIG. 4.

In some embodiments, the data source device may set the encryption bit in the control register to indicate that subsequent transmissions of reporting data may be encrypted (i.e., perform the operations of optional block 604), but the associated recipient device may not able to handle the encrypted data. For example, the recipient device may not be configured to perform regular data decryptions and/or may not have the resources for such decryptions (e.g., low battery, processor is overburdened, etc.). In such a case, the recipient device may be configured to transmit a failure message in response to the data source device transmitting the authentication response. Such a failure message may include data (e.g., error messages, etc.) that indicates whether the data source device should renegotiate with the recipient device. In some embodiments, the recipient device may include in the failure message data a number of negotiation attempts (or retries) that the data source device should attempt. In some embodiments, the number of negotiation attempts may be included within the control register information, may be pre-configured, and/or may be changed via update messages received from a remote server or via over-the-air (OTA) messages. Similar to embodiments described above, in some embodiments the recipient device may set the encryption bit in the control register to indicate that subsequent transmissions of reporting data should be encrypted, but the data source device may not be able to handle the encrypted data. In such a case, negotiation requests may be utilized as described above. For example, the recipient device may renegotiate with the data source device via a negotiation request that may be indicated as another bit in the control register ("a retry"), and if the negotiation fails, an 'attach request' may be rejected with an appropriate error cause.

In response to determining that a success message was received (i.e., determination block 418="Yes"), the data source device, via its primary processor, may determine whether the data encryption key (Kd) is shared by the secure processor for use with the primary processor in determination block 608. For example, the primary processor may determine whether the data encryption key (Kd) was posted by the secure processor (e.g., whether signals over a shared bus was received indicating the key, etc.) and/or whether the key (Kd) is otherwise accessible to the primary processor (e.g., stored within a non-secured register, memory location, etc.). In response to determining that the data encryption key (Kd) is not shared for use with the primary processor (i.e., determination block 608="No"), the data source device may continue transmitting unencrypted outgoing reporting data to the recipient device in block 420 as described with reference to FIG. 4.

In response to determining that the data encryption key (Kd) is shared for use with the primary processor (i.e., determination block 608="Yes"), the data source device, via its primary processor, may encrypt data using the data encryption key (Kd) and the shared encryption algorithm in block 610. The data source device, via its primary processor, may transmit the encrypted outgoing reporting data to the recipient device in block 612. As described above, such transmissions may be via point-to-point communications, such as short-range wireless signaling using a Bluetooth® communication protocol, etc. In some embodiments, the data source device may add information to the message including the encrypted outgoing reporting data that indicates the data is or is not encrypted, such as a header bit or flag.

FIG. 7 illustrates an embodiment method 700 for a recipient device to utilize a secure processor to authenticate a data source device (e.g., a simple sensor device, etc.) for providing encrypted reporting data to be used by the recipient device. The method 700 may be similar to the method 500 described above with reference to FIG. 5, including many of the same operations. However, the method 700 may also include operations for decrypting reporting data sent after the data source device has been authenticated by the recipient device. In other words, based on an encryption bit (e.g., bit-0) of a control register, the recipient device may decrypt reporting data received from the data source device using an algorithm and data encryption key (Kd) shared with the data source device.

After performing the operations of blocks 502-523 as described above with reference to FIG. 5 (i.e., determining that decrypted data matches T and thus the data source device is authenticated), the recipient device, via its secure processor, may determine whether the incoming reporting data is to be decrypted in determination block 702. In particular, the secure processor may evaluate a predefined bit (i.e., an encryption bit) within the control register received from the data source device in the authentication response message. For example, the recipient device may determine subsequently received reporting data from the data source device will be encrypted and thus needed to be decrypted using the data encryption key (Kd) when the first bit of the control register (CR) returned in the authentication response message is set to a '1' value. In some embodiments, the operations in determination block 702 may be optional in some cases as the recipient device and the data source device may be configured to always encrypt or not encrypt transferred reporting data (e.g., sensor data).

In response to determining that the incoming reporting data is to be decrypted (i.e., determination block 702="Yes"), the recipient device, via its secure processor, may share the data encryption key (Kd) with its primary processor in block 704, such as by posting the data encryption key (Kd). The recipient device may also provide information indicating the encryption algorithm to be used with the data encryption key. In response to determining that the incoming reporting data is not to be decrypted (i.e., determination block 702="No"), or in response to performing the sharing operations of block 704, the recipient device, via its primary processor, may transmit a success message to the data source device in block 524, and may receive incoming reporting data from the data source device in block 526 as described above with reference to FIG. 5.

In determination block 706, the recipient device, via its primary processor, may determine whether the data encryption key (Kd) is shared, thus indicating the received incoming reporting data may need to be decrypted. In some embodiments, the recipient device may determine whether received reporting data from the data source device is to be decrypted based on data within the received data packets, such as metadata, header information, or other bits indicating whether the included data is encrypted or not. In response to determining that the data encryption key (Kd) has been shared by the secure processor (i.e., determination block 706="Yes"), the recipient device, via its primary processor, may decrypt the incoming reporting data using the data encryption key (Kd) and the shared encryption algorithm in block 708. In block 710 the recipient device, via its primary processor, may process the decrypted incoming reporting data. In response to determining that the data encryption key (Kd) has not been shared by the secure processor (i.e., determination block 706="No"), the recipient device, via its primary processor, may process received incoming reporting data that is not encrypted in block 528 as described above with reference to FIG. 5.

Various forms of computing devices, including personal computers and laptop computers, may be used to implement the various embodiments, including the recipient devices and/or data source devices and embodiment methods described with reference to FIGS. 1-7. Such computing devices typically include the components illustrated in FIG. 8 which illustrates an example smartphone-type mobile computing device 800. In various embodiments, the mobile computing device 800 may include a processor 801 (or primary processor) coupled to a touch screen controller 804 and an internal memory 802. The processor 801 may be one or more multicore ICs designated for general or specific processing tasks. The internal memory 802 may be volatile or non-volatile memory, and may also be secure and/or encrypted memory, or another and/or unencrypted memory, or any combination thereof. The mobile computing device 800 may also include a secure element 880 that may be a secure processor distinct from the processor 801 or alternatively may be a secure element that is supported by or otherwise included within the processor 801. For example, the secure element 880 may be a UICC or a trust zone within an ARM processor. The touch screen controller 804 and the processor 801 may also be coupled to a touch screen panel 812, such as a resistive-sensing touch screen, capacitive-sensing touch screen, infrared sensing touch screen, etc. The mobile computing device 800 may have one or more radio signal transceivers 808 (e.g., Bluetooth®, ZigBee®, Wi-Fi®, RF, NFC, etc.) and antennae 810, for sending and receiving, coupled to each other and/or to the processor 801. The transceivers 808 and antennae 810 may be used with the above-mentioned circuitry to implement the various wireless transmission protocol stacks and interfaces. In some embodiments, the mobile computing device 800 may include a cellular network wireless modem chip 816 that enables communication via a cellular network and is coupled to the processor 801. The mobile computing device 800 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The mobile computing device 800 may also include speakers 814 for providing audio outputs. The mobile computing device 800 may also include a housing 820, constructed of a plastic, metal, or a combination of materials, for containing all or some of the components discussed herein. The mobile computing device 800 may include a power source 822 coupled to the processor 801, such as a disposable or rechargeable battery. The rechargeable battery may also be coupled to the peripheral device connection port to receive a charging current from a source external to the mobile computing device 800.

Figure 9:
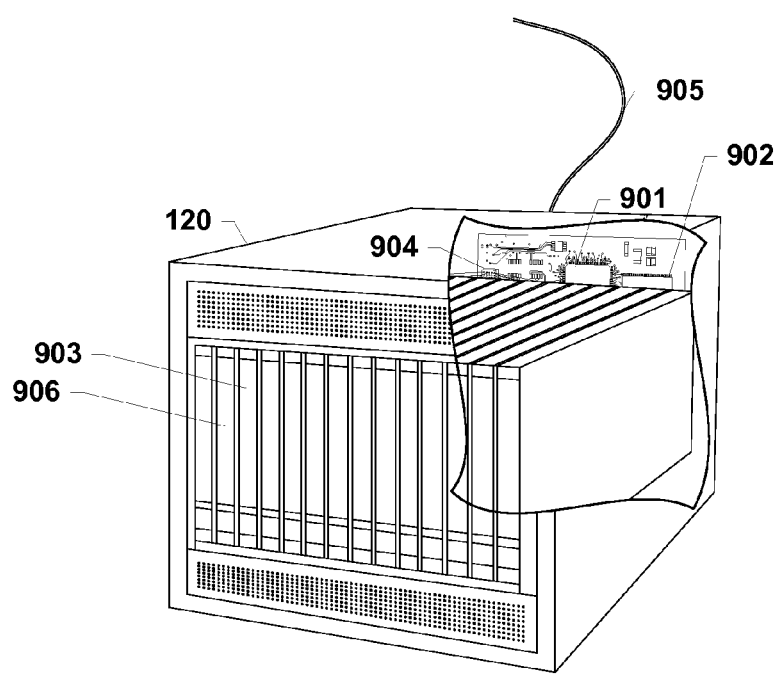
FIG. 9 is a component block diagram of a remote server computing device suitable for use in various embodiments.

FIG. 9 illustrates an example remote server computing device 120 suitable for use in various embodiments, including the embodiment methods described with reference to FIGS. 3-7. Such a remote server computing device 120 may typically include a processor 901 coupled to volatile memory 902 and a large capacity nonvolatile memory, such as a disk drive 903. The remote server computing device 120 may also include a floppy disc drive, compact disc (CD) or DVD disc drive 906 coupled to the processor 901. The remote server computing device 120 may also include network access ports 904 (or interfaces) coupled to the processor 901 for establishing data connections with a network 905, such as the Internet and/or a local area network coupled to other system computers and remote servers.

Various forms of computing devices, including devices within robots, medical equipment devices, and/or sensor devices, may be used to implement the various embodiments as data source devices. Such computing devices typically include the components illustrated in FIG. 10 which illustrates a generic data source device 1000 that may implement the data source device embodiments and embodiment methods described with reference to FIGS. 1-7. The data source device 1000 may include a processor 1001 coupled to internal memory 1002, which may be volatile or non-volatile memory, and may also be secure and/or encrypted memory, or another and/or unencrypted memory, or any combination thereof. The data source device 1000 may also include a secure element 1006 that may be a secure processor distinct from the processor 1001 or alternatively may be a secure element that is supported by or otherwise included within the processor 1001. For example, the secure element 1006 may be a UICC or a trust zone within an ARM processor. The data source device 1000 may also include various input unit(s) 1008 configured to receive information that may be transmitted to other devices for processing. For example, the input unit(s) 1008 may include various sensors coupled to the processor 1001, such as an accelerometer, a gyroscope, a microphone, a camera, and/or user input devices (e.g., a mouse, a keyboard, etc.). The data source device 1000 may include a wireless transceiver/antenna 1010 (e.g., Bluetooth®, ZigBee®, Wi-Fi®, RF radio, etc.) for sending and receiving electromagnetic radiation (or wireless signals) as described herein. In some embodiments, the data source device 1000 may also include a wide area network (WAN) functionality 1012, such as a long-range radio transceiver/antenna, a cellular network chip, an Ethernet port/interface, and/or other equipment, modules, or functionalities for sending and receiving communications to remote sources over various networks, such as a cellular network, a local area network (LAN) connected to the Internet, etc. The various components 1001-1012 may be coupled together via a bus 1020. In some embodiments, the data source device 1000 may include other functionalities for providing power to the data source device 1000 in order to operate the various components 1001-1012, such as a battery, power cord, etc.

Some embodiment systems may include simple data source devices (e.g., sensors) that are designed to economically provide sensor information to other devices using secure element authentication procedures as described herein. In other words, embodiment techniques may utilize data source devices (e.g., sensor devices) that merely have sensor data gathering, transmission, and secure element capabilities. Such simple data source devices may not be complex computing devices, but instead basic devices having processing capabilities adequate only for performing embodiment authentication operations via secure elements (e.g., UICCs) and sending reporting data. FIG. 11 illustrates such a simple data source device 1100 that may be used with the embodiment methods described with reference to FIGS. 3-7. Such a simple data source device 1100 may include a secure element 1101 configured to perform authentication operations as described herein, a simple sensor 1106 (e.g., a contact switch 1110 or pressure switch, etc.) that, when activated based on an input (e.g., a depression of an attached button/trigger 1108), may cause reporting data to be transmitted using a wireless transceiver 1102 and an antenna 1103. For example, reporting data may be sent via electromagnetic radiation (or wireless signals) according to various communication protocols (e.g., Bluetooth®, ZigBee®, Wi-Fi®, RF, etc.). The simple data source device 1100 may also include a power source 1120 for providing power to the data source device 1100 in order to operate the various components 1101-1110, such as a battery, power cord, etc.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or a non-transitory processor-readable storage medium. The steps of a method or algorithm disclosed herein may be embodied in a processor-executable software module or processor-executable software instructions which may reside on a non-transitory computer-readable storage medium and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of using secure elements to authenticate a data source device for providing reporting data to a recipient device, comprising:

generating, via a first secure processor of the recipient device, a first random token, a data encryption key, and a first control register;

encrypting, with the first secure processor, the first random token, the first control register, and the data encryption key using a shared encryption algorithm and a secret key associated with a unique identifier of the data source device to generate first encrypted data;

transmitting, via a primary processor of the recipient device, an authentication request message to the data source device that includes the first encrypted data for decryption by a second secure processor of the data source device, wherein the authentication request message is transmitted using local point-to-point communications;

receiving, via the primary processor, an authentication response message over the local point-to-point communications from the data source device that includes a second encrypted data, wherein the second encrypted data comprises a second encrypted random token and a second encrypted control register generated by decrypting the encrypted data to generate a second random token and a second control register and re-encrypting the second random token and the second control register to generate the second encrypted random token and the second encrypted control register;

decrypting, via the first secure processor, the second encrypted data using the shared encryption algorithm and the secret key to generate at least the second random token;

determining, via the first secure processor, whether the decrypted data includes the second random token that matches the first random token; and identifying, via the first secure processor, the data source device is authenticated in response to determining that the decrypted data includes the second random token that matches the first random token.

2. The method of claim 1, further comprising:

transmitting, via the primary processor, a success message to the data source device in response to determining that decrypted data includes the second random token that matches the first random token, wherein the success message is transmitted using the local point-to-point communications; and transmitting, via the primary processor, a failure message to the data source device in response to determining that decrypted data does not include the second random token that matches the first random token, wherein the failure message is transmitted using the local point-to-point communications.

3. The method of claim 1, further comprising receiving, via the primary processor, an attach request from the data source device that includes the unique identifier associated with the data source device, wherein the attach request is received via the local point-to-point communications, and wherein transmitting, via the primary processor, the authentication request message to the data source device that includes the first encrypted data comprises transmitting, via the primary processor, the authentication request message to the data source device that includes the first encrypted data in response to receiving the attach request.

4. The method of claim 1, further comprising:

receiving, via the first secure processor, the unique identifier associated with the data source device and the secret key associated with the unique identifier from a remote server; and storing, via the first secure processor, the unique identifier and the secret key.

5. The method of claim 1, further comprising:

receiving, via the primary processor, incoming reporting data from the data source device, wherein the incoming reporting data is received using the local point-to-point communications; and processing, via the primary processor, the received incoming reporting data when the data source device is identified as authenticated.

6. The method of claim 5, wherein the control register includes a bit indicating whether future encryption is enabled, the method further comprising:

determining, via the first secure processor, whether incoming reporting data is to be decrypted based on the bit;

sharing, via the first secure processor, the data encryption key with the primary processor in response to determining that the incoming reporting data is to be decrypted; and decrypting, via the primary processor, the incoming reporting data using the shared encryption algorithm and the data encryption key.

7. The method of claim 1, wherein the first secure processor is a universal integrated circuit card (UICC).

8. The method of claim 1, wherein the recipient device is one of a smartphone, a laptop, and a terminal computer.

9. The method of claim 1, wherein the local point-to-point communications are short-range wireless signals using a wireless communication protocol or communications via a wired connection.

10. A method of using secure elements to authenticate a data source device for providing reporting data to a recipient device, comprising:

transmitting, via a primary processor of the data source device, an attach request message to the recipient device that includes a unique identifier associated with the data source device, wherein the attach request message is transmitted using local point-to-point communications;

receiving, via the primary processor, an authentication request message from the recipient device that includes data encrypted via a first secure processor of the recipient device, wherein the authentication request message is received using the local point-to-point communication;

decrypting, via a second secure processor of the data source device, the encrypted data using a shared encryption algorithm and a secret key associated with the unique identifier to obtain a random token, a control register, and a data encryption key;

re-encrypting, via the second secure processor, the random token and the control register using the shared encryption algorithm and the secret key; and transmitting, via the primary processor, an authentication response message to the recipient device that includes re-encrypted data comprising the re-encrypted random token and the re-encrypted control register for decryption by the first secure processor, wherein the authentication response message is transmitted using the local point-to-point communications.

11. The method of claim 10, further comprising transmitting, via the second secure processor, the unique identifier and the secret key to a remote server.

12. The method of claim 10, further comprising:

determining, via the primary processor, whether a success message is received from the recipient device in response to transmitting the authentication response message; and transmitting, via the primary processor, outgoing reporting data to the recipient device in response to determining that the success message is received, wherein the outgoing reporting data is transmitted using the local point-to-point communications.

13. The method of claim 12, wherein the control register includes a bit indicating whether future encryption is enabled, the method further comprising:

determining, via the second secure processor, whether outgoing reporting data is to be encrypted based on the bit;

sharing, via the second secure processor, the data encryption key with the primary processor in response to determining that the outgoing reporting data is to be encrypted; and encrypting, via the primary processor, the outgoing reporting data using the shared encryption algorithm and the data encryption key.

14. The method of claim 10, wherein the second secure processor of the data source device is a universal integrated circuit card (UICC).

15. The method of claim 10, wherein the data source device is one of a smartphone, a robot, a medical equipment device, and a sensor device.

16. The method of claim 10, wherein the local point-to-point communications are short-range wireless signals using a wireless communication protocol or communications via a wired connection.

17. A computing device, comprising:
a primary processor and a first secure processor,
wherein the first secure processor of the computing device is configured with processor-executable instructions for performing operations comprising:
generating a first random token, a data encryption key, and a first control register; and
encrypting the random token, the control register, and the data encryption key using a shared encryption algorithm and a secret key associated with a unique identifier of a data source device to generate first encrypted data, and
wherein the primary processor of the computing device is configured with processor-executable instructions for performing operations comprising:
transmitting an authentication request message to the data source device that includes the first encrypted data for decryption by a second secure processor of the data source device, wherein the authentication request message is transmitted using local point-to-point communications; and
receiving an authentication response message over the local point-to-point communications from the data source device that includes a second encrypted data, wherein the second encrypted data comprises second encrypted random token and a second encrypted control register generated by decrypting the encrypted data to generate a decrypted-encrypted random token and re-encrypting the second random token and the second control register to generate the second encrypted random token and the second encrypted control register, and
wherein the first secure processor of the computing device is configured with processor-executable instructions for performing operations further comprising:
decrypting the second encrypted data using the shared encryption algorithm and the secret key to generate at least the second random token;
determining whether decrypted data includes the second random token that matches the first random token; and
identifying the data source device is authenticated in response to determining that the decrypted data includes the second random token that matches the first random token.

18. The computing device of claim 17, wherein the primary processor of the computing device is configured with processor-executable instructions for performing operations further comprising:

transmitting a success message to the data source device in response to determining that decrypted data includes the second random token that matches the first random token, wherein the success message is transmitted using the local point-to-point communications; and transmitting a failure message to the data source device in response to determining that decrypted data does not include the second random token that matches the first random token, wherein the failure message is transmitted using the local point-to-point communications.

19. The computing device of claim 17, wherein the primary processor of the computing device is configured with processor-executable instructions for performing operations further comprising:

receiving an attach request from the data source device that includes the unique identifier associated with the data source device, wherein the attach request is received via the local point-to-point communications, and wherein the primary processor of the computing device is configured with processor-executable instructions for performing operations such that transmitting the authentication request message to the data source device that includes the first encrypted data comprises transmitting the authentication request message to the data source device that includes the first encrypted data in response to receiving the attach request.

20. The computing device of claim 17, wherein the first secure processor of the computing device is configured with processor-executable instructions for performing operations further comprising:

receiving the unique identifier associated with the data source device and the secret key associated with the unique identifier from a remote server; and storing the unique identifier and the secret key.

21. The computing device of claim 17, wherein the primary processor of the computing device is configured with processor-executable instructions for performing operations further comprising:

receiving incoming reporting data from the data source device, wherein the incoming reporting data is received using the local point-to-point communications; and processing the received incoming reporting data when the data source device is identified as authenticated.

22. The computing device of claim 21, wherein the control register includes a bit indicating whether future encryption is enabled, and wherein the first secure processor of the computing device is configured with processor-executable instructions for performing operations further comprising:

determining whether incoming reporting data is to be decrypted based on the bit; and sharing the data encryption key with the primary processor in response to determining that the incoming reporting data is to be decrypted, and wherein the primary processor of the computing device is configured with processor-executable instructions for performing operations further comprising:
    decrypting the incoming reporting data using the shared encryption algorithm and the data encryption key.

23. The computing device of claim 17, wherein the first secure processor of the computing device is a universal integrated circuit card (UICC).

24. The computing device of claim 17, wherein the computing device is one of a smartphone, a laptop, and a terminal computer.

25. A computing device, comprising:
a primary processor and a second secure processor,
wherein the primary processor of the computing device is configured with processor-executable instructions for performing operations comprising:
    transmitting an attach request message to a recipient device that includes a unique identifier associated with the computing device, wherein the attach request message is transmitted using local point-to-point communications; and
    receiving an authentication request message from the recipient device that includes data encrypted via a first secure processor of the recipient device, wherein the authentication request message is received using the local point-to-point communications, and
wherein the second secure processor of the computing device is configured with processor-executable instructions for performing operations comprising:
    decrypting the encrypted data using a shared encryption algorithm and a secret key associated with the unique identifier to obtain a random token, a control register, and a data encryption key; and
    re-encrypting the random token and the control register using the shared encryption algorithm and the secret key, and
wherein the primary processor of the computing device is configured with processor-executable instructions for performing operations further comprising:
    transmitting an authentication response message to the recipient device that includes re-encrypted data comprising the re-encrypted random token and the re-encrypted control register for decryption by the first secure processor, wherein the authentication response message is transmitted using the local point-to-point communications.

26. The computing device of claim 25, wherein the second secure processor of the computing device is configured with processor-executable instructions for performing operations further comprising transmitting the unique identifier and the secret key to a remote server.

27. The computing device of claim 25, wherein the primary processor of the computing device is configured with processor-executable instructions for performing operations further comprising:
    determining whether a success message is received from the recipient device in response to transmitting the authentication response message; and
    transmitting outgoing reporting data in response to determining that the success message is received, wherein the outgoing reporting data is transmitted using the local point-to-point communications.

28. The computing device of claim 27, wherein the control register includes a bit indicating whether future encryption is enabled, and
wherein the second secure processor of the computing device is configured with processor-executable instructions for performing operations further comprising:
    determining whether outgoing reporting data is to be encrypted based on the bit; and
    sharing the data encryption key with the primary processor of the computing device in response to determining that the outgoing reporting data is to be encrypted, and
wherein the primary processor of the computing device is configured with processor-executable instructions for performing operations further comprising encrypting the outgoing reporting data using the shared encryption algorithm and the data encryption key.

29. The computing device of claim 25, wherein the second secure processor of the computing device is a universal integrated circuit card (UICC).

30. The computing device of claim 25, wherein the computing device is one of a smartphone, a robot, a medical equipment device, and a sensor device.

* * * * *